(12) United States Patent
Aminabhavi et al.

(10) Patent No.: US 7,045,062 B1
(45) Date of Patent: May 16, 2006

(54) PERVAPORATION MEMBRANES AND METHODS OF USE

(75) Inventors: Tejraj M. Aminabhavi, Dallas, TX (US); Padmakar V. Kulkarni, Dallas, TX (US); Mahaveer Kurkuri, Dharwad (IN)

(73) Assignee: Seventy-Seventh Meridian Corporation, LLC, Dallas, TX (US)

( * ) Notice: Subject to any disclaimer, the term of this patent is extended or adjusted under 35 U.S.C. 154(b) by 0 days.

(21) Appl. No.: 10/348,269

(22) Filed: Jan. 21, 2003

(51) Int. Cl.
*B01D 71/42* (2006.01)
*B01D 71/00* (2006.01)
*B01D 71/38* (2006.01)
*B01D 71/78* (2006.01)

(52) U.S. Cl. .................... 210/500.43; 210/500.42; 210/640

(58) Field of Classification Search ................. 210/640, 210/500.43, 500.42
See application file for complete search history.

(56) References Cited

U.S. PATENT DOCUMENTS

| | | | | |
|---|---|---|---|---|
| 2,953,502 | A | | 9/1960 | Binning et al. ............... 202/42 |
| 4,911,844 | A | * | 3/1990 | Linder et al. ................ 210/638 |
| 4,968,430 | A | * | 11/1990 | Hildenbrand et al. ....... 210/640 |
| 5,156,740 | A | * | 10/1992 | Bruschke .................... 210/490 |
| 5,334,314 | A | * | 8/1994 | Neel et al. ................... 210/640 |

FOREIGN PATENT DOCUMENTS

EP 0436128 A1 12/1990

OTHER PUBLICATIONS

Fernandez, et al., "Grafting of Vinyl Acetate-Methyl Acrylate Mixture onto Cellulose. Effect of Ceric Ion and Nitric Acid Concentrations", Journal of Applied Polymer Science, vol. 41, p. 2221-2240, 1990.
Bhat, et al., "Methanol-selective membranes for the pervaporative separation of methanol-toluene mixtures", Journal of Membrance Science, 167, pp. 187-201, 2000.
Aminabhavi, et al., "A study of sorption/desorption profiles and diffusion anomalies of organic haloalkanes into a polymeric blend of ethylene-propylene random copolymer and isotactic polypropylene", Polymer vol. 37, No. 9; pp. 1677-1684, 1996.

(Continued)

*Primary Examiner*—Joseph Drodge
*Assistant Examiner*—K S Menon
(74) *Attorney, Agent, or Firm*—Baker Botts L.L.P.

(57) ABSTRACT

Pervaporation membranes including poly(acrylamide)-grafted alginate membranes, which may be optimized for the separation of alcohols from water, low viscosity sodium alginate membranes containing PEG and PVA, which may be optimized for the separation of organic acids from water, and copolymeric PAN-grafted PVA membranes, which may be optimized for the separation of DMF from water, and methods of making such membranes. Use of such membranes in pervaporation and pervaporation devices containing such membranes. Use of such membranes alone or in combination with ion-exchange membranes for recovery of organic compounds or for water purification applications such as production of potable water or industrial waste treatment. The membranes of the present invention may be used to remove trace amounts of water from organic compounds.

13 Claims, 4 Drawing Sheets

OTHER PUBLICATIONS

Neel, et al., "Influence of Downstream Pressure on the Pervaporation of Water-Tetrahydrofuran Mixtures Through a Regenerated Cellulose Membrane (Cuprophan)", Journal of Membrane Science, 27, pp. 217-232, 1986.

Mulder, et al., "Preferential Sorption Versus Preferential Permeability in Pervaporation", Journal of Membrane Science, 22, pp. 155-173, 1985.

Huang, et al., "Characteristics of sodium alginate membranes for the pervaporation dehydration of ethanol-water and isopropanol-water mixtures", Journal of Membrane Science, 160, pp. 101-113, 1999.

Kurkuri, et al., "Systheses and Characterization of Blend Membranes of Sodium Alginate and Poly(vinyl alcohol) for the Pervaporation Separation of Water + Isopropanol Mixtures", Journal of Applied Polymer Science, vol. 86, pp. 3642-3651, 2002.

Yang, et al., "Effects of $Ca^2+$ bridge cross-linking on structure and pervaporation of cellulose/alginate blend membranes", Journal of Membrane Science, 175, pp. 53-60, 2000.

Toti, et al., "Pervaporation Separation of Water-Isopropyl Alcohol Mixtures with Blend Membranes of Sodium Alginate and Poly(acrylamide)-Grafted Guar Gum", Journal of Applied Polymer Science, vol. 85, pp. 2014-2024, 2002.

Moon, et al., "Novel two-ply composite membranes of chitosan and sodium alginate for the pervaporation dehydration of isopropanol and ethanol", Journal of Membrane Science, 156, pp. 17-27, 1999.

Wang, Xin-Ping, "Modified alginate composite membranes for the dehydration of acetic acid", Journal of Membrane Science, 170, pp. 71-79, 2000.

Bhagat, et al., "Kinetics and Mechanism of Drug Release from Calcium Alginate Membrane Coated Tablets", Drug Development and Industrial Pharmacy, 20(3), pp. 387-394, 1994.

Kikuchi, et al., "Effect of $Ca^2+$ -alginate gel dissolution on release of dextran with different molecular weights", Journal of Controlled Release, 58, pp. 21-28, 1999.

Kumaresh, et al., "Chemically modified polyacrylamide-g-guar gum-based crosslinked anionic microgels as pH-sensitive drug delivery systems: preparation and characterization", Journal of Controlled Release, 75, pp. 331-345, 2001.

Tomihata, et al., "Crosslinking of Hyaluronic Acid with Glutaraldehyde", Journal of Polymer Science: Part A: Polymer Chemistry, vol. 35, pp. 3553-3559, 1997.

Chiang, et al., "Separation of Liquid Mixtures by Using Polymer Membranes. I.. Water-Alcohol Separation by Pervaporation through PVA-g-MMA/MA Membrane", Journal of Applied Polymer Science, vol. 43, pp. 2005-2012, 1991.

Li, et al., "Pervaporation of Water/THF Mixtures using Zeolite Membranes", Ind. Eng. Chem. Res., 40, pp. 4577-4585, 2001.

Yeom, et al., "Characterization of Relaxation Phenomena and Permeation Behaviors in Sodium Alginate Membrane During Pervaporation Separation of Ethanol-Water Mixture", Journal of Applied Polymer Science, vol. 62, pp. 1561-1576, 1996.

Shieh, et al., "Chitosan/N-methalol nylon 6 blend membranes for the pervaporation separation of ethanol-water mixtures", Journal of Membrane Science, 148, pp. 243-255, 1998.

Huang, et al., "Crosslinked chitosan composite membrane for the pervaporation dehydration of alcohol mixtures and enhancement of structural stability of chitosan/polysulfone composite membranes", Journal of Membrane Science, 160, pp. 17-30, 1999.

Jo, et al., "Separation of Water-Ethanol Mixture through Poly(acrylonitrile-co-Acrylic acid)/Poly(ethylene Oxide) Membranes by Prevaporation", Journal of Applied Polymer Science, vol. 51, pp. 529-535, 1994.

Kim, et al., "Pervaporation separation of water from ethanol-through polymide composite membranes", Journal of Membrane Science, 169, pp. 81-93, 2000.

Lee, et al., "Dehydration of ethanol/water mixtures by pervaporation with composite membranes of polyacrylic acid and plasma-treated polycarbonate", Journal of Membrane Science, 164, pp. 13-23, 2000.

Kurkuri, et al., "Synthesis and Characterization of Polyacrylamide-Grafted Sodium Alginate Copolymeric Membranes and their use in Pervaporation Separation of Water and Tetrahydrofuran Mixtures", Journal of Applied Polymer Science, vol. 86, pp. 272-281, 2002.

Aminabhavi, et al., "Pervaporation Separation of Water/Dimethylformamide Mixtures using Poly(vinyl-alcohol)-g-polyacrylamide Copolymeric Membranes", Journal of Applied Polymer Science, vol. 83, pp. 273-282, 2002.

Mino, et al., "A New Method for the Preparation of Graft Copolymers. Polymerization Initiated by Ceric Ion Redox Systems", Journal of Polymer Science, vol. 31, Issue No. 22, pp. 242-243, 1958.

Yeom, et al., "Characterization of Sodium Alginate Membrane Crosslinked with Glutaraldehyde in Pervaporation Separation", Journal of Applied Polymer Science, vol. 67, pp. 209-219, 1998.

Yeom, et al., "Characterization of Sodium Alginate and Poly(vinyl alcohol) Blend Membranes in Pervaporation Separation", Journal of Applied Polymer Science, vol. 67, pp. 949-959, 1998.

Huang, et al., "Pervaporation dehydration of aqueous ethanol and isoporpanol mixtures through alginate/chitosan two ply composite membranes supported by poly(vinylidene fluoride) porous membrane", Journal of Membrane Science, 167, pp. 275-289, 2000.

Chatterji, Prabha R., "Glutaraldehyde Crosslinked Gelatin with Polyacrylamide Grafts", J. Macromol. Sci.-Chem., A27(4), pp. 435-443, 1990.

Binning, et al., "Separation of Liquid Mixtures by Permeation", Ind. Eng. Chem, vol. 53, No. 1, pp. 45-50, 1961.

Aminabhavi, et al., "Synthesis of Graft Copolymeric Membranes of Poly(vinyls alcohol) and Polyacrylamide for the Pervaporation Separation of Water/Acetic Acid Mixtures", Journal of Applied Polymer Science, vol. 83, pp. 244-258, 2002.

Burshe, et al., "Pervaporative Dehydration of Organic Solvents", Separation Science and Technology, vol. 32(8), pp. 1335-1349, 1997.

Nam, et al., "Pervaporation separation of methanol/methyl *t*-butyl ether through chitosan composite membrane modified with surfactants", Journal of Membrane Science, 157, pp. 63-71, 1999.

Ping, et al., "Pervaporation of Water-Ethanol Mixtures through a Poly(acrylic acid) Grafted Polyethylene Membrane. Influence of Temperature and Nature of Counter-Ions", Journal of Membrane Science, 48, pp. 297-308, 1990.

Zhang, et al., "Ion exchange membranes blended by cellulose cuoxam with alginate", Journal of Membrane Science, vol. 124, pp. 195-201, 1997.

Cao, et al., "Influence of acetylation degree of cellulose acetate on pervaporation properties for MeOH/MTBE mixture", Journal of Membrane Science, vol. 165, pp. 89-97, 2000.

Soppimath, et al., "Biodegradable polymeric nanoparticles as drug delivery devices", Journal of Controlled Release, vol., 70, pp. 1-20, 2001.

Fischer, F.G.; "Die Polyuronsäuren der Braunalgen (Kohlenhydrate der Algen I", Hoppe-Seyler's Zeitschrift für Physiologische Chemie, vol. 302, pp. 186-203, 1955.

Haug, et al., "A Study of the Constitution of Alginic Acid by Partial Acid Hydrolysis", Acta Chemica Scandinavica, vol. 20, pp. 183-190, 1966.

Moe, et al., "Alginates", Food Polysaccharides and Their Applications, First Ed., Marcel Dekker, Inc., pp. 245-286, 1995.

Mochizuki, et al., "Pervaporation Separation of Water/Ethanol Mixtures through Polysaccharide Membranes. IV. The Relationships between the Permselectivity of Alginic Acid Membrane and its Solid State Structure", Journal of Applied Polymer Science, vol. 40, pp. 385-400, 1990.

Uragami, et al., "Studies on Syntheses and Permeabilities of Special Polymer Membranes. 68. Analysis of Permeation and Separation Characteristics and New Technique for Separation of Aqueous Alchoholic Solutions through Alginic Acid Membranes", Separation Science and Technology, vol. 24(7), pp. 541-554, 1989.

Chanachai, et al., "Pervaporation with chitosan/hydroxyethylcellulose (CS/HEC) blended membranes", Journal of Membrane Science, vol. 166, pp. 271-280, 2000.

Toti, et al., "Sorption, Diffusion, and Pervaporation Separation of Water-Acetic Acid Mixtures through the Blend Membranes of Sodium Alginate and Guar Gum-Grafted-Polyacrylamide", Journal of Applied Polymer Science, vol. 83, pp. 259-272, 2002.

Meier-Haack, et al., "Pervaporation separation of water/alcohol mixtures using composite membranes based on polyelectrolyte multilayer assemblies", Journal of Membrane Science, vol. 184, pp. 233-243, 2001.

Qureshi, et al., "Acetone butanol ethanol (ABE) recovery by pervaporation using silicalite-silicone composite membrane from fed-batch reactor of *Clostridium acetobutylicum*", Journal of Membrane Science, vol. 187, pp. 93-102, 2001.

Huang, et al., "Polyaniline Membranes for Pervaporation of Carboxylic Acids and Water", Macromolecules, vol. 31, pp. 5456-5464, 1998.

Kusumocahyo, et al., "Dehydration of acetic acid by pervaporation with charged membranes", Journal of Membrane Science, vol. 161, pp. 77-83, 1999.

Jegal, et al., "Development of Polyion Complex Membranes for the Separation of Water-Alcohol Mixtures. III. Preparation of Polyion Complex Membranes Based on the k-Carrageenan for the Pervaporation Separation of Water-Ethanol", Journal of Applied Polymer Science, vol. 60, pp. 1177-1183, 1996.

Park, et al., "Pervaporation of pyridine-water mixture through poly(acrylonitrile-co-monoacryloxyethyl phosphate) membrane", Journal of Membrane Science, vol. 164, pp. 121-128, 2000.

Ping, et al., "Pervaporation of water-ethanol mixtures with polyacrylate-grafted polyethylene acid (PE-g-AA) mebranes Physico-chemical analysis of the transport mechanism", Journal of Membrane Science, vol. 195, pp. 23-34, 2002.

Okuno, et al., "Characteristics of permeation and separation of aqueous alcohol solutions through crosslinked pullulan membranes", Polymer, vol. 33, No. 7, pp. 1459-1463, 1992.

Bhat, et al., "Perparation of Cellulose Triacetate Pervaporation Membrane by Ammonia Plasma Treatment", Journal of Applied Polymer Science, vol., 76, pp. 258-265, 2000.

Huang, et al., "Chitosan/anionic surfactant complex membranes for the pervaporation separation of methanol/MTBE and characterization of the polymer/surfactant system", Journal of Membrane Science, vol., 184, pp. 1-15, 2001.

Jiraratananon, et al., "Pervaporation dehydration of ethanol-water mixtures with chitosan/hydroxyethylcellulose (CS/HEC) composite membranes I. Effect of operating condition", Journal of Membrane Science, vol. 195, pp. 143-151, 2002.

Aminabhavi, et al., "Pervaporation Separation of Organic-Aqueous and Organic—Organic Binary Mixtures", J.M.S.—Rev. Macromol. Chem. Phys., vol. C34(2), pp. 139-204, 1994.

Chen, et al., "PVA membrane filled β-cyclodextrin for separation of isomeric xylenes by pervaporation", Chemical Engineering Journal, vol. 78, pp. 159-164, 2000.

Huang, et al., "Pervaporation Membrane Separation Processes", Membrane Science and Technology Series, I., 1991.

Osorio-Galindo, et al., "Characterization of Poly(dimethylsiloxane)-Poly(methyl hydrogen siloxane) Composite Membranes for Organic Water Pervaporation Separation", Journal of Applied Polymer Science, vol. 81, pp. 546-556, 2001.

Pradhan, et al., "Separation of Phenol-Water Mixture by Membrane Pervaporation using Polyimide Membranes", Journal of Applied Polymer Science, vol. 83, pp. 822-829, 2002.

SciFinder Scholar Search using search term "Pervaporation and Organic-Water Mixtures", 64 Pages, May 7, 2002.

SciFinder Scholar Search Using Search Terms "Pervaporation", "Polyvinyl Alcohol", and "1998-2002", 33 Pages, May 7, 2002.

* cited by examiner

PERVAPORATION MEMBRANES AND METHODS OF USE

FIELD OF THE INVENTION

The present invention relates to a process for making pervaporation separation membranes that can be used for the separation of organic substances, particularly volatile organic substances, from water. More particularly, it relates to novel processes for producing and using membranes for the effective separation of alcohols, organic acids and other organic compounds from water and vice versa. The invention additionally includes pervaporation membranes made by the processes of the invention and methods of using such membranes.

BACKGROUND OF THE INVENTION

A number of organic compounds may be found in water, particularly water contaminated by various industrial processes. It is desirable to remove such compounds from the water for a large variety of reasons, ranging from water purification to recovery of the organic compounds.

As is well known to those skilled in the art, it is possible to remove water from mixtures thereof with organic liquids by various techniques including adsorption or distillation. These conventional processes, particularly distillation, are however, characterized by high capital cost. In the case of distillation, for example, the process requires expensive distillation towers, heaters, heat exchangers (reboilers, condensers, etc), together with a substantial amount of auxiliary equipment typified by pumps, collection vessels, vacuum generating equipment, etc. Such operations are characterized by high operating costs principally costs of heating and cooling-plus pumping, etc.

Furthermore, the properties of the materials being separated, as is evidenced by the distillation curves, may be such that a large number of plates may be required, etc. When the material forms an azeotrope with water, additional problems may be present which for example, would require that separation be effected in a series of steps (e.g. as in two towers) or by addition of extraneous materials to the system. There are also comparable problems which are unique to adsorption systems.

It has been found to be possible to utilize membrane systems to separate mixtures of miscible liquids by pervaporation. In this process, the charge liquid is brought into contact with a membrane film; and one component of the charge liquid preferentially permeates the membrane. The permeate is then removed as a vapor from the downstream side of the film-typically by sweeping with a carrier gas or by reducing the pressure below the saturated vapor pressure of the permeating species.

A number of pervaporation membranes have been developed for separation of azeotropes and organic compounds from water. (See Aminabhavi, T. M.; Khinnavar, R. S.; Harogoppad, S. B.; Aithal, U. S.; Nguyen, Q. T.; Hansen, K. C. J. Macromol Sci.-Rev Macromol Chem Phys 1994, C43, 139; Li, S.; Tuan, V. A.; Noble, R. D.; Falconer, J. L. Ind Eng Chem Res, 2001, 40, 4577; Yeom, C. K.; Jegal, J. G.; Lee, K. H. J Appl Polym Sci 1996, 62, 1561; Shieh, J. J.; Huang, R. Y. M. J Membrane Sci 1998, 148, 243; Okuno, H.; Uragami, T. Polymer 1992, 33, 1459.) Examples of such membranes are described in U.S. Pat. No. 2,953,502 issued on Sep. 20, 1960 to Binning, R. C. and Lee, R. J and in Neel, J.; Nguyen, Q. T.; Bruschke, H. Europaaiaches Patentamt Anmeidung 90123133.2, Dec. 21, 1990. Other pervaporation membranes include blend membranes (Chanachi, A.; Jiraratananon, R.; Uttapap, D.; Moon, G. Y.; Anderson, W. A.; Haung, R. Y. M., J Membr Sci 2000, 16, 6271; Toti, U. S.; Kariduraganavar, M. Y.; Soppimath, K. S.; Aminabhavi, T. M., J Appl Polym Sci 2002, 83, 259), composite membranes (Meier-Haack, J.; Lenk, W.; Lehmann, D.; Lunkwitz, K., J Membr Sci 2001, 184, 233; Qureshi, N.; Meagher, M. M.; Huang, J.; Hutkins, R. W., J Membr Sci 2001, 187, 93), charged membranes (Huang, S. C.; Ball, I. J.; Kaner, R. B, Macromolecules 1998, 31, 5456; Kusumocahyo, S. P.; Sudoh, M, J Membr Sci 1999, 161, 77), polyion complex membranes (Jegal, J.; Lee, K.-H., J Appl Polym Sci 1996, 60, 1177), copolymer membranes (Park, C. H.; Nam, S. Y.; Lee, Y. M.; Kujawski, W., J Membr Sci 2000, 164, 121), and grafted copolymer membranes (Ping, Z. H.; Nguyen, Q. T.; Chen, S. M.; Ding, Y. D., J Membr Sci 2002, 195, 23).

Natural polymers have also been used in pervaporation membranes. (See Okuno, H.; Uragami, T., Polymer 1992, 33, 1459; Zhang, L.; Zhou, D.; Wang, H.; Cheng, S. J Membr Sci 1997, 124, 195; Bhat, N. V.; Wavhal, D. S., J Appl Polym Sci 2000, 76, 258; Huang, R. Y. M.; Moon, G. Y.; Pal, R. J Membr Sci 2001, 184, 1; Chanachi, A.; Jiraratananon, R.; Uttapap, D.; Moon, G. Y.; Anderson, W. A.; Huang, R. Y. M. J Membr Sci 2000, 166, 271; Cao, S.; Shi, Y.; Chen, G. J Membr Sci 2000, 165, 89; Soppimath, K. S.; Aminabhavi, T. M.; Kulkarni, A. R.; Rudzinsiki, W. E. J Control Rel 2001, 70, 1; and Jiraratananon, R.; Chanachai, A.; Huang, R. Y. M.; Uttapap D. J Membr Sci 2002, 195, 143.)

Among natural polymer membranes, sodium alginate (SA) membranes are known to have superior pervaporation separation characteristics when used to separate mixtures of water and methanol or water and ethanol. (See Uragami, T.; Saito, M. Sep Sci Technol 1989, 24, 541.) Sodium alginate is a watersoluble polysaccharide that may be gelled by acid treatment or by crosslinking with glutaraldehyde or Ca ions. Sodium alginate is a coplymer composed of 1→4)-linked β-D-mannuronic acid (M) and α-L-guluronic acid (G) residues arranged in blockwise fashion.

Three different types of blocks are possible: homopolymeric MM blocks, homopolymeric GG blocks and heteropolymeric, sequentially alternating MG blocks. (See Fischer, F. G.; Dorfel, H. Hoppe Seyler's Z. Physiol Chem 1955, 302, 186; and Huang, A.; Larsan, B.; Smidsroed, O. Acta Chem Scand 1966, 20, 183.) Properties of the polymer vary based one the amount of α-L-guluronic acid (G). (See Moe, S. T.; Draget, K. I.; Break, G. S.; Smidsrod, O.; Alginates, in A. M. Stephen (Ed.), Food Polysaccharides and their Applications, First Ed., Marcel Dekker, New York, 1995, pp. 245–286.)

Mochizuki et al., studied the relationship between permselectivity of alginic acid membrane and its solid state structure as well as the effect of counter cations on membrane performance (Mochizuki, A.; Amiya, S.; Sato, Y.;

Ogawara, H.; Yamashita, S. J Appl Polym Sci 1990, 40, 385). Aminabhavi et al. have prepared blend membranes of SA with polyacrylamide-grafted-gaur gum and studied their PV separation characteristics for acetic acid+water and isopropanol+water mixtures (Toti, U.S.; Kariduraganavar, M. Y.; Soppimath, K. S.; Aminabhavi, T. M. J Appl Polym Sci 2002, 83, 259; Toti, U.S.; Aminabhavi, T. M. J Appl Polym Sci 2002, Accepted). Additionally, some studies have also been carried out to understand the effect of polymer viscosity on diffusion of drugs using calcium alginate membrane coated tablets. (See Bhagat, R. H.; Mendes, R. W.; Mathiowotz, E.; Bhargava, H. N. Drug Dev Ind Pharm 1994, 20, 387; Kikuchi, A.; Kawabuchi, M.; Watanabe, A.; Sugihara, M.; Sakurai, Y.; Okano, T., J Control Rel 1999, 58, 21.)

However, sodium alginate membranes suffer from lack of mechanical stability. This problem can be corrected somewhat by cross-linking the membranes (Yeom, C. K.; Lee, K. H., J Appl Polym Sci 1998, 67, 209), blending the sodium alginate with other stable polymers (Yeom, C. K.; Lee, K. H., J Appl Polym Sci 1998, 67, 949), or by developing composite membranes (Huang, R. Y. M.; Pal, R.; Moon, G. Y. J Membr Sci. 2000, 166, 275; Kurkuri, M. D.; Toti, U.S.; Aminabhavi, T. M. J Appl Polym Sci 2002, Accepted; Yang, G.; Zhang, L.; Peng, T.; Zhong, W. J Membr Sci 2000, 175, 53). Several asymmetric membranes have been prepared as thin film composites of SA with different hydrophilic and hydrophobic support materials. (See Moon, G. Y.; Pal, R.; Huang, R. Y. M. J Membr Sci 1999, 156, 17–27; Huang, R. Y. M.; Pal, R.; Moon, G. Y. J Membr Sci 2000, 166, 275; and Wang, X. N. J Membr Sci 2000, 170, 71.) However, even sodium alginate membranes with these improvements in mechanical stability remain unsuitable for many uses.

In addition to addressing mechanical stability problems, achieving the simultaneous enhancement of both selectivity and flux or enhancement of one characteristic without decrease of the other is a challenging task in the area of pervaporation membranes. To achieve this goal, many efforts have been made to fabricate or modify different types of membranes. (See Huang, R. Y. M.; Pal, R.; Moon, G. Y. J Membrane Sci 1999, 160, 17; Jo, W. H.; Kim, H. J.; Kang, Y. S. J Appl Polym Sci 1994, 51, 529; Kim, J. H.; Lee, K. H.; Kim, S. Y. J Membrane Sci 2000, 169, 81; and Lee, K. R.; Teng, M. Y.; Lee, H. H.; Lai, J, Y. J Membrane Sci 2000, 164, 13.) For instance, efforts from different groups have utilized different types of membranes for the pervaporation separation of aqueous-organic mixtures. (See Kurkuri, M. D.; Kumbar, S. G.; Aminabhavi, T. M. J Appl Polym Sci 2002, In press; Kurkuri, M. D.; Toti, U.S.; Aminabhavi, T. M. J Appl Polym Sci 2002, In press; Toti, U. S.; Kariduraganavar, M. Y.; Soppimath, K. S.; Aminabhavi, T. M. J Appl Polym Sci 2002, 83, 259; Aminabhavi, T. M.; Naik, H. G. J Appl Polym Sci 2002, 83, 244; and Aminabhavi, T. M.; Naik, H. G. J Appl Polym Sci 2002, 83, 273.) However, improvements in flux or selectivity remain useful for improving overall pervaporation membrane quality and for allowing additional uses of such membranes.

SUMMARY OF THE INVENTION

The present invention includes an acrylamide grafted alginate membrane. In one embodiment, the membrane has an acrylamide monomer to alginate polymer ratio of between about 1:2 and 1:1 and is cross-linked with glutaraldehyde. The alginate may be sodium alginate or any other type of alginate. Other cellulosic polymers may also be used. The membrane may be optimized for the separation of alcohol, such as isopropanol, and water. PEG or PVA may also be included in the membrane.

The invention additionally includes a method of forming a pervaporation membrane by first mixing alginate with acrylamide monomer in a ratio of between 1:2 and 1:1. In one embodiment, sodium alginate may be used, although use of other alginate sources or other cellulosic polymers may be acceptable. Potassium persulfate, for example in an amount of around 3 g per every 1 g of sodium alginate polymer, may them be added to the mixture and the resulting polymer precipitated. The polymer may then be mixed with water and PEG and PVA added to the mixture. In certain embodiments, approximately 10 mass % PEG and approximately 5 mass % PVA are added. Finally, this mixture may be cast as a membrane and cross-linked with glutaraldehyde. In certain embodiments, the membrane is cross-linked in a solution of water and alcohol in a ratio of approximately 25:75 additionally containing approximately 1 volume % glutaraldehyde. The membrane may be optimized for the separation of alcohol, such as isopropanol, methanol or ethanol, from water.

The invention also includes a pervaporation membrane including low viscosity sodium alginate, PEG and PVA and cross-linked with glutaraldehyde. In certain embodiments, the membrane includes approximately 10 mass % PEG and between approximately 5 and 20 mass % PVA. Specific embodiments include between approximately 10 mass % PEG and approximately 5 mass % PVA. The membrane may be optimized for the separation of organic acids, such as acetic acid, from water.

A novel method of the invention relates to forming a pervaporation membrane by first forming a solution of low viscosity sodium alginate polymer, for example polymer with a viscosity of approximately 138 mPa·s for a 5% solution, and adding PEG and PVA to the solution. In certain embodiments approximately 10 mass % PEG and between 5 and 20 mass % PVA are added to the solution. A membrane may be cast from the polymer solution and then cross-linked with glutaraldehyde, for instance a solution of water and alcohol in a ratio of 25:75 containing approximately 1 volume % glutaraldehyde. Such membranes may be optimized for the separation of organic acids such as acetic acid from water.

Another aspect of the invention relates to the preparation of a copolymeric PAN-grafted PVA membrane. In certain embodiments, the membrane has grafting ratios between 46% and 93%. Increasing the % PAN in such membranes may increase their selectivity. Certain membranes may be optimized for separation of DMF from water.

Another method of the invention relates to forming a pervaporation membrane by forming a solution of PVA in DMSO under a nitrogen atmosphere, adding PAN to the solution, in certain embodiments in a range of 46% to 93% grafting calculated considering mass, then adding CAN to the solution and precipitating the polymer. Another solution may then be prepared from the polymer and cross-linked, for example with glutarahdehyde, then cast as a membrane. Such membranes may be optimized for the separation of DMF from water.

The invention also includes a method of separating organic compounds from water using any of the above membranes. The membrane may be placed between two chambers in a pervaporation device with at least two chambers. Water mixed with the organic compound may be supplied to one chamber and pressure decreased in the second chamber on the other side of the pervaporation membrane. For instance, the method may be used to separate organic acids such as acetic acid, alcohols such as isopropanol, methanol or ethanol, of DMF from water.

Another aspect of the present invention relates to a pervaporation device with at least two chambers and any pervaporation membrane described above affixed between the two chambers in manner to prevent fluid flow from one chamber to the other.

The invention additionally includes water purification systems including hybrid processes i.e., one ion-exchange unit and at least one pervaporation unit or distillation unit, if necessary. The membrane used in the pervaporation unit may be selected from any of the membranes described above. Multiple ion exchange units or pervaporation units may be combined to use hybrid or multiple membranes of each type. In certain embodiments hybrid pervaporation units are included and some units contain membranes optimized to separate different organic compounds from water than the membranes in other units. In exemplary embodiments, the ion exchange membranes are 4-vinyl pyridine anion exchange membranes crosslinked with aniline and epicholorohydrin, cation exchange membranes formed from formaldehyde-crosslined PVA, and/or cation exchange membranes formed from brominated PVA. These systems may be used for various water purification applications, such as production of potable water and purification of industrial waste, for instance to meet environmental control standards. The systems may also form part of a recovery process to remove ions and/or organic compounds from water. Such recovery processes may be coupled to purification process and the systems may be used with both and additional ends in mind.

For a better understanding of the invention and its advantages, reference may be made to the following description of exemplary embodiments, taken in conjunction with the accompanying drawings.

BRIEF DESCRIPTION OF THE DRAWINGS

The invention may be further understood through reference to the following drawings in which.

DETAILED DESCRIPTION OF THE INVENTION

Figure 1:
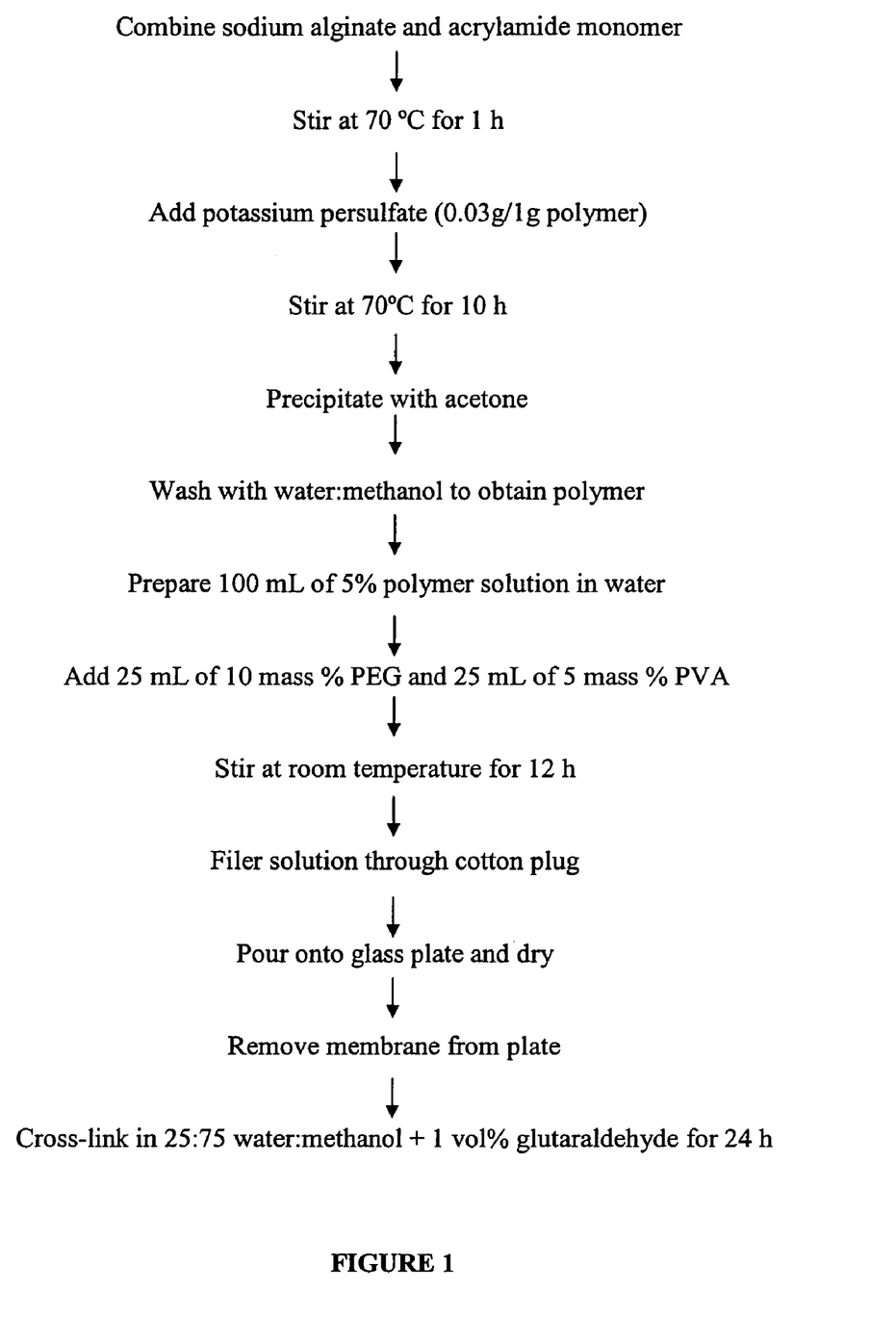
FIG. 1 illustrates a method for preparing a poly(acrylamide)-grated sodium alginate membrane according to an embodiment of the present invention.
Figure 2:
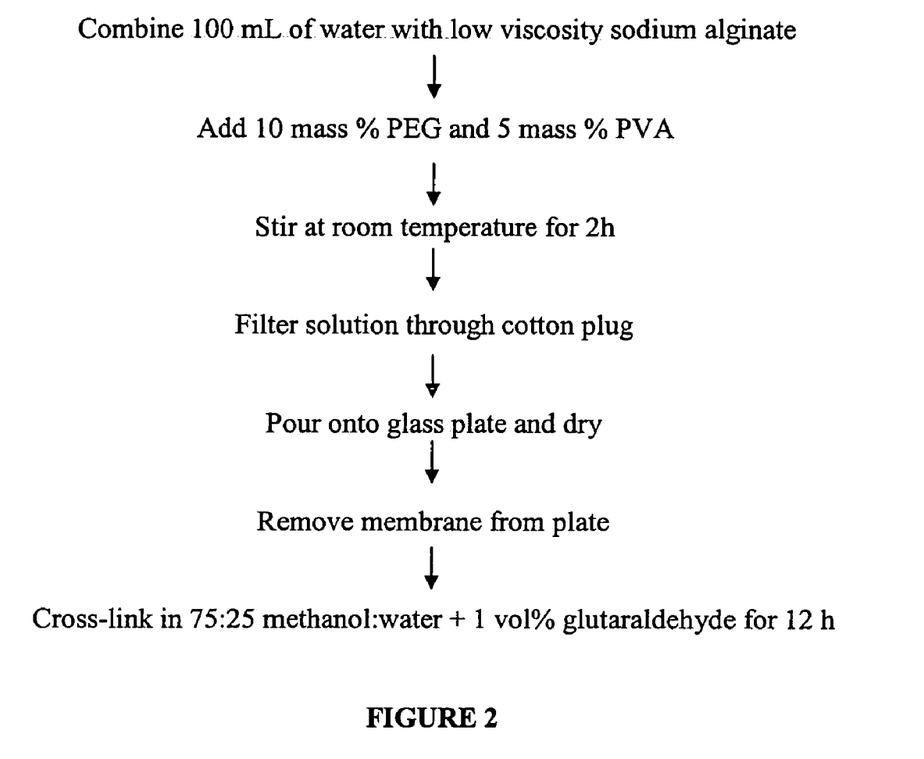
FIG. 2 illustrates a method for preparing a low viscosity sodium alginate membrane containing polyethylene glycol and poly(vinyl) alcohol according to an embodiment of the present invention.
Figure 3:
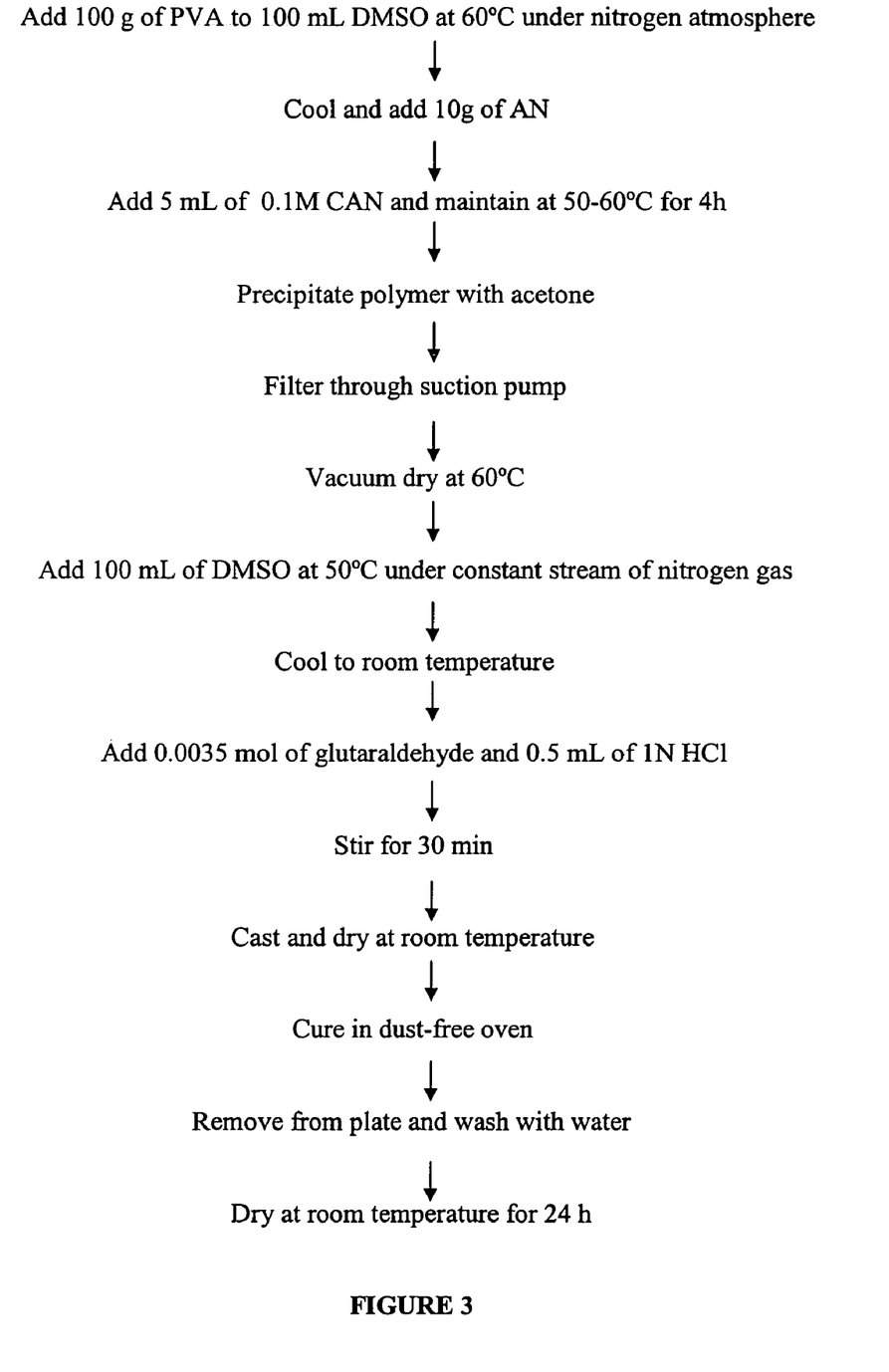
FIG. 3 illustrates a method for preparing a polyacrylenitrile-grafted poly(vinyl) alcohol membrane according to an embodiment of the present invention.
Figure 4:
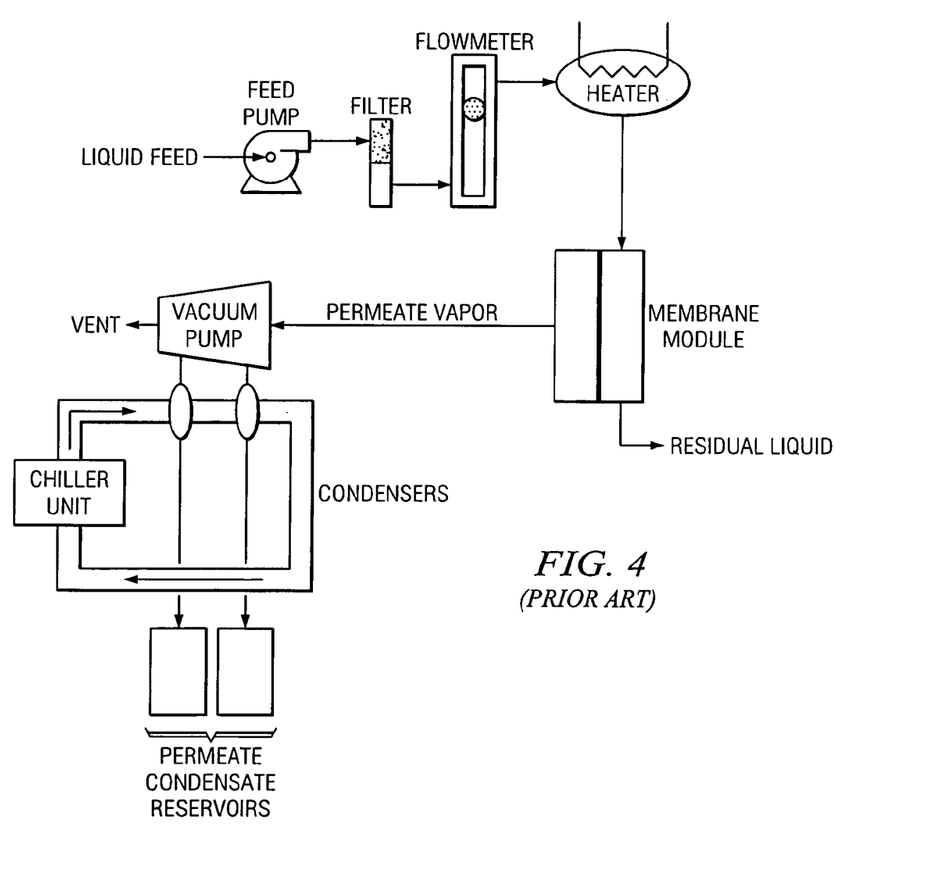
FIG. 4 illustrates a prior art pervaporation process which may be used with membranes of the present invention or in hybrid processes of the present invention.

The present invention includes pervaporation membranes with desirable mechanical, flux, and/or stability characteristics. It also includes processes for the production and use of such membranes.

One embodiment of the present invention relates to poly(acrylamide)-grafted-sodium alginate membranes which may be used for the separation of alcohols from water. Such membranes may be prepared by free radical polymerization using a sodium alginate polymer to acrylamide monomer ratio of about 2:1 or 1:1. To increase the membrane stability, the membranes may be cross-linked with glutaraldehyde. The membranes of this embodiment are useful in separating organic alcohols, particularly isopropanol from aqueous mixtures. The membranes are efficient for such separations in the temperature range of approximately 30–50° C. The membranes are particularly effective in separating 10 to 50 mass % and particularly approximately 20 mass % isopropanol-containing aqueous mixtures. Similar mass % aqueous mixtures of other alcohols may also be separated using the membranes of this embodiment.

Another embodiment of the present invention relates to sodium alginate membranes prepared with polyethylene glycol (PEG) and poly(vinyl) alcohol (PVA) and with different viscosity grade sodium alginate to optimise their capacity for the separation of water/acetic acid mixtures. Such membranes also exhibit improved membrane flexibility.

Specifically, the membranes may be prepared using a selected viscosity grade sodium alginate that is cross-linked with glutaraldehyde in a 50:50 volume water:ethanol mixture. The membranes may be cast using the solution casting method known to the art. Specific optimized membranes of this embodiment are able to achieve suitable separation of acetic acid:water mixtures or other organic acid:water mixtures of 10–50 mass % water at approximately 30° C. Membranes prepared from low viscosity grade polymer exhibit the highest separation selectivity for organic acid:water mixtures containing 10 to 20 mass % water. Membranes prepared from higher viscosity grade polymers exhibit higher flux, but lower selectivity. Accordingly, polymer viscosity for membranes of the present embodiment may be selected to achieve the desired balance between selectivity and flux for a given application.

However, flux may also be increased by adding PEG and PVA to membranes prepared with low viscosity grade polymers. Specifically, membranes prepared with approximately 10 mass % PEG and 5 mass % PVA exhibit high flux and selectivity. Membranes prepared with approximately 10 mass % PEG and 10 mass % PVA have lower selectivity than those prepared with 5 mass % PVA, but exhibit higher flux. Accordingly, the present invention also includes membranes prepared with low viscosity grade sodium alginate and PEG, to which PVA is added to increase flux. The amount of PVA in such membranes may be varied to achieve the desired balance between selectivity and flux for a given application.

Although the previous embodiments have focused on membranes prepared from sodium alginate, it will be apparent to one skilled in the art that other alginates may be readily substituted for sodium alginate. Additionally, other natural or synthetic polymers with properties similar to sodium alginate may also be used to construct membranes that will benefit from the techniques described above. Such membranes are also within the scope of the present invention.

Another embodiment of the invention relates to copolymeric polyacrylonitrile-grafted-PVA membranes which are useful for the separation of dimethyl formamide (DMF) and water mixtures. In a specific embodiment, such membranes are modified to obtain an optimum combination of flux and selectivity. Membranes containing approximately 46% to 93% polyacrylonitrile (PAN) may be used to separate DMF:water mixtures of between approximately 10 to 90 mass % water at temperatures from about 25 to 45° C.

All of the membranes described above may be used for water purification through separation of organic compounds. Such organic compounds may be naturally present in the water or may be the result of a non-natural activity such as an agricultural or industrial process or pollution. The purified water may be purified to drinking quality according to standards set forth by organizations such as the World Health Organization. It may also be purified for industrial uses or prior to release into the environment. Recovery processes of the present invention may also be used to recapture organic material.

Membranes of the present invention may be used to separate alcohols, organic acids, or DMF from water. In particular, the poly(acrylamide)-grafted sodium alginate membranes and similar membranes may be used to separate alcohols, such as ethanol, isoproponal, and methanol from water. The sodium alginate membranes containing PEG and PVA, in particular the low viscosity sodium alginate membranes, are well suited for separation or organic acids, such as acetic acid, from water. Finally, the PAN-grafted PVA membranes are useful for separating DMF from water. These membranes may be used alone or in combination to remove a variety of organic contaminants.

The membranes of the present invention may be utilized in current pervaporation systems. Any slight modifications that may be required will be apparent to one skilled in the art. The increased mechanical strength of the membranes of the present invention may allow for less frequent replacement when used with conventional systems. Additionally, the membranes of the present invention may be able to withstand greater stresses, such as lower pressure on one side of the membrane, than some conventional pervaporation membranes.

In one embodiment, pervaporation purification using membranes of the present invention may be coupled with ion exchange purification. Various ion exchange membranes are known to the art. In a specific embodiment, ion exchange membranes as described in U.S. patent application Ser. No. 10/007,442 filed Dec. 5, 2001 (the '442 application, incorporated by reference herein) are used. An ion exchange tank as described in the '442 application may be coupled to one or more pervaporation tanks. Such tanks may be placed before or after the ion exchange tank. More than one tank may be used to contain pervaporation membranes optimized to separate specific organic molecules.

Although only preferred embodiments of the invention are specifically described above and in the following examples, it will be appreciated that modifications and variations of the invention are possible without departing from the spirit and intended scope of the invention.

EXAMPLES

Synthesis of Poly(Acrylamide)-Grafted-Sodium Alginate Copolymer

Sodium alginate, ammonium persulfate, isopropanol, acetone and methanol used in the following example were all of analytical reagent (AR) grade. Poly(acrylamide) grafted-sodium alginate copolymer was prepared by persulfate induced radical polymerization using sodium alginate polymer to acrylamide monomer ratios of 2:1 or 1:1. A 10 mass % aqueous solution of sodium alginate was prepared in a three-necked round bottom flask and stirred vigorously for 1 h after adding the correct ratio of acrylamide monomer at 70° C. Then, a 100 mL solution containing potassium persulfate initiator at a concentration of $10^{-3}$ moles (0.03 g/1 g of expected polymer) was added and the reaction was continued for 10 h at 70° C. under nitrogen atmosphere. Free radical sites were generated by abstracting hydrogen from the —OH group of the polymer to facilitate the grafting of acrylamide onto sodium alginate. The mass obtained was precipitated in acetone and washed with a water:methanol (7:3 by volume mixture to remove the homopolymer formed. The solid polymer was dried in an electrically controlled oven at 40° C., weighed and stored in a desiccator until further use. The monomer conversion was up to 90% for both the copolymers as indicated in Table I, which also provides synthetic details.

TABLE I

Synthetic Details of Polyacrylamide-grafted-Sodium Alginate Copolymers

| Sample Code | Mass of Polymer (g) | Mass of AAm (g) | Mass of Initiator (g/g of polymer) | % Grafting | Grafting Efficiency | % Conversion of AAm |
|---|---|---|---|---|---|---|
| NaAlg | 0 | 0 | 0 | 0 | 0 | 0 |
| NaAlg-1 | 10 | 5 | 0.3 | 44 ± 1 | 96 ± 1 | 89 ± 1 |
| NaAlg-2 | 10 | 10 | 0.3 | 94 ± 1 | 98 ± 1 | 95 ± 1 |

The sodium alginate is pure polymer without grafting while NaAlg-1 and -2 are the grafted copolymers of sodium alginate and acrylamide.

The reaction scheme for the graft copolymerization is as follows:

Example 2

Polymer Characterization of Poly(Acrylamide) Grafted-Sodium Alginate

Polymers prepared as described in Example 1 were characterized by Fourier transform infrared (FTIR) spectra of the polymer samples in KBr pellets using a Nicolet, Model Impact 410, USA in the wavelength region of 4000 to 400 cm$^{-1}$. For the neat NaAlg, a characteristic broad band appearing at ~3420 cm$^{-1}$ corresponds to O—H stretching vibrations of NaAlg. A sharp peak observed at ~1616 cm$^{-1}$ corresponds to carbonyl group of —COONa moiety present in NaAlg. In the spectra of grafted copolymers, shoulder peaks appearing at ~3190 cm$^{-1}$ and a sharp peak at ~1672 cm$^{-1}$ corresponding to N—H stretching and C=O stretching vibrations, respectively and confirm the grafting reaction. A new peak at ~1450 cm$^{-1}$ in case of NaAlg-1 and NaAlg-2 corresponds to C—N bending vibration further providing evidence of the grafting reaction.

Viscosity measurements of the aqueous solutions of sodium alginate (NaAlg) and the grafted copolymers (NaAlg-1 and NaAlg-2) were, respectively prepared in mass % concentration of 0.25, 1.0 and 1.0 at 30° C. using Schott-Gerate Viscometer (Model AVS 350, Germany). The kinematic viscosity of 0.25 mass % solution of neat NaAlg is 1.65 Stokes while for 1 mass % solution of NaAlg-1 and NaAlg-2 polymers, these values are 2.11 and 2.96 Stokes, respectively. Decrease in viscosity of NaAlg-1 and NaAlg-2 solutions confirms the grafting reaction. Higher viscosity observed for NaAlg-2 when compared to NaAlg-1 may be due to the increased chain length and hence the increased entanglement of the polymer chain.

Example 3

Fabrication of Poly(Acrylamide)-Grafted-Sodium Alginate Membranes

The following membranes were used in Examples 4–8. A 5% solution by mass of the poly(acrylamide)-grafted-sodium alginate copolymer (as described in Examples 1 and 2) was prepared in 100 mL distilled water. To this, 25 ml of a previously prepared solution of polyethylene glycol (PEG) sufficient to achieve 10 mass % PEG and 25 ml of a previously prepared solution of poly(vinyl alcohol)(PVA) sufficient to achieve 5 mass % PVA were added and stirred for 12 h at room temperature The solution was filtered through a cotton plug and membranes were cast on a leveled glass plate and dried at room temperature. The membranes obtained were peeled off from glass plate and cross-linked in acidic (25:75) water:methanol mixture containing 1.0 vol. % of glutaraldehyde for 24 h. The membranes were designated, respectively as NaAlg, NaAlg-1 and NaAlg-2 representing neat sodium alginate membrane, 2:1 alginate:acrylamide copolymer membrane and 1:1 alginate:acrylamide membrane, respectively. Membranes thus prepared were stored in a dry atmosphere at room temperature and used in separation studies.

In another variation of the membrane preparation process, membranes otherwise similar to the NaAlg, NaAlg-1 and NaAlg-2 membranes above were crosslinked by glutaraldehyde in an acidic water:ethanol (25:75 by volume) mixture. Ethanol, being a non-solvent, helped to prevent the dissolution of the membrane and the water present in solution may be responsible for membrane swelling, further facilitating crosslinking in the presence of glutaraldehyde. Both of the copolymeric membranes were brittle and this may be due to the crystalline nature of acrylamide present. To increase the flexibility of copolymeric membranes, 10 mass % of PEG and 5 mass % of PVA were added to the membranes. Addition of 10 mass % of PVA resulted in a phase separation in both the NaAlg-1 and NaAlg-2 types of membranes.

Example 4

Sorption Runs

The tests of the present example provide information regarding membrane stability. Dynamic and equilibrium sorption experiments on membranes were performed in water+isopropanol feed mixtures at 30±0.5° C. in an electronically controlled oven (WTB Binder, Germany). For these studies, circularly cut (≈4.00 cm diameter) disk shaped membranes were kept in a vacuum oven at 25° C. for 48 h before use. Initial mass of these membranes was measured on a top loading single pan digital microbalance (Model AE 240, Switzerland) sensitive to ±0.01 mg. Samples were placed inside the air-tight test bottles containing different compositions of water+isopropanol mixtures. Test bottles were placed in an oven maintained at the constant temperature of 30° C. Mass measurements were performed at suitably selected time intervals by removing samples from the test bottles, wiping the surface-adhered solvent drops by gently pressing them in between filter paper wraps, weighing the samples immediately, and again placing them back into test bottles in the oven. In order to minimize the errors due to evaporation losses, this step was completed within 15–20 s. From gravimetric data, equilibrium mass % uptake (M∞ or S) by the membrane was calculated from the initial dry mass of the membrane, $W_0$ and the mass of the membrane, at equilibrium W∞ (~48 h) as, $$S = \frac{W_\infty - W_0}{W_0} \times 100 \quad (1)$$

These data are presented in Table II below.

Table II: Equilibrium Mass % Uptake (S) and Sorption Selectivity ($\alpha_{sorp}$) of the Membranes at 30° C.

TABLE II

Equilibrium Mass % Uptake (S) and Sorption Selectivity ($\alpha_{sorp}$) of the Membranes at 30° C.

| Mass % Water in the Feed | S (kg/kg) eq. (1) | | | $\alpha_{sorp}$ eq. (2) | | |
|---|---|---|---|---|---|---|
| | NaAlg | NaAlg-1 | NaAlg-2 | NaAlg | NaAlg-1 | NaAlg-2 |
| 10 | 14.43 | 10.77 | 15.00 | 60.2 | 853 | 325.83 |
| 20 | 21.41 | 22.41 | 30.68 | 21.3 | 61.7 | 172.7 |
| 30 | 31.27 | 33.98 | 45.30 | 14.0 | 18.6 | 26.7 |
| 40 | 36.74 | 46.88 | 60.81 | 22.4 | 13.4 | 21.5 |
| 50 | 44.83 | 62.42 | 78.17 | 9.5 | 10.7 | 16.9 |
| 60 | 51.29 | 71.80 | 90.29 | 6.0 | 10.4 | 5.2 |
| 70 | 60.83 | 89.31 | 131.9 | 4.9 | 7.3 | 5.7 |
| 80 | 66.75 | 104.4 | 151.9 | 4.7 | 6.0 | 6.7 |

For calculation of selectivity see Example 5.

Example 5

Sorption Selectivity ($\alpha_{sorp}$)

Each completely equilibrated membrane in each different mass % water containing mixture from Example 4 was removed from the test bottle and the surface adhered liquid drops were removed by blotting with a tissue paper. It was then placed inside the glass-trap connected to another cold trap surrounded by liquid nitrogen and then heated to 110° C. (beyond the boiling temperature of water). The vapor was condensed in the cold trap surrounded by liquid nitrogen jar. Composition of the condensed liquid mixture was then determined by measuring its refractive index (accurate to ±0.0002 units) using an Abbe Refractometer (Atago 3T, Japan) and by comparing it with a standard graph. Sorption selectivity was calculated using, $$\alpha_{sorp} = \frac{M_W / M_{Iso-OH}}{F_W / F_{Iso-OH}} \quad (2)$$

where $M_w$, $M_{Iso-OH}$ and $F_w$, $F_{Iso-OH}$ are the mass % of water and isopropanol, respectively in the membrane and the feed mixture. The results of sorption selectivity are included in Table II.

Equilibrium mass % uptake of water-isopropanol mixture increased with % grafting of the membrane (see Table II) at all the compositions of water-isopropanol mixture except at 10 mass % of water in the feed mixture. The results of $\alpha_{sorp}$ are higher at 10 mass % of water in the feed mixture and drastically decrease with an increasing amount of water in the feed mixture. Also, the $\alpha_{sorp}$ values increase with increasing grafting i.e., from the neat NaAlg to the grafted copolymer membranes for all the concentrations of water in the feed mixture.

Example 6

Pervaporation Tests

Pervaporation (PV) experiments were performed using the module described in Aminabhavi, T. M.; Naik, H. G. J Appl Polym Sci 2002, 83, 244. Effective surface area of the membrane in contact with the feed mixture was 32.4 cm$^2$ and the capacity of PV cell used was about 250 cm$^3$. The mass % of water in feed mixtures with isopropanol was varied from 10 to 80. After placing 150 mL of the feed mixture in the feed compartment for each test, the test membrane was allowed to equilibrate for 2 h. Then, the downstream side of the PV apparatus was continuously evacuated by using a vacuum pump (Toshniwal, India) at a vacuum pressure of 10 torr and permeate mixture was condensed in liquid nitrogen traps. Mass of the permeate mixture collected in the trap was taken and its composition was determined by measuring its refractive index and by comparing it with a standard graph. Additional feed mixture was provided as necessary to the feed compartment.

From PV data, the membrane performance was studied by calculating the total flux, $J_p$, and separation selectivity, $\alpha_{sep}$ as, $$J_P = \frac{W_P}{At} \quad (3)$$

$$\alpha_{sep} = \frac{P_w / P_{Iso-OH}}{F_w / F_{Iso-OH}} \quad (4)$$

In the above equations, $W_p$ is mass of the permeate, A is the area of the membrane in contact with the feed mixture and t is time; $P_w$ and $P_{Iso-OH}$ are the mass % of water and isopropanol respectively, in the permeate; $F_w$ and $F_{Iso-OH}$ are the mass % of water and isopropanol in the feed mixture, respectively; $C_w^P$ and $C_w^F$ are concentrations of permeate and feed mixture, respectively. The results of pervaporation flux and $\alpha_{sep}$ are presented in Table III.

TABLE III

Pervaporation Flux and Separation Selectivity at Different Mass % of Water in the Feed Mixture at 30° C. for Different Membranes

| Mass % of Water in the Feed | Jp × 10$^2$ (kg/m$^2$h) eq. (3) | | | $\alpha_{sep}$ eq. (4) | | |
|---|---|---|---|---|---|---|
| | NaAlg | NaAlg-1 | NaAlg-2 | NaAlg | NaAlg-1 | NaAlg-2 |
| 10 | 5.0 | — | — | 3591 | — | — |
| 20 | 14.6 | 14.7 | 17.6 | 96.0 | 96.0 | 53.1 |
| 30 | 22.6 | 23.2 | 32.5 | 49.5 | 44.3 | 36.6 |
| 40 | 31.8 | 46.1 | 56.6 | 28.5 | 23.5 | 19.9 |
| 50 | 44.0 | 58.5 | 76.8 | 14.4 | 13.3 | 11.5 |
| 60 | 51.1 | 68.6 | 84.3 | 11.1 | 12.0 | 7.5 |
| 70 | — | 112.2 | — | — | 10.9 | — |
| 80 | 88.4 | — | — | 8.59 | — | — |

The results of pervaporation flux and separation selectivity of all the membranes at 30° C. are presented in Table III. It is generally observed that flux increases from neat NaAlg to NaAlg-1 and NaAlg-2 membranes; similarly an increase in flux is observed with an increasing amount of water in the feed mixture. On the contrary, separation selectivity decreases from NaAlg to NaAlg-2 membrane as well as with increasing amount of water in the feed mixture. High permeation separation index is observed for neat sodium alginate membrane.

Example 7

Diffusion Coefficients

The diffusion coefficient, Di of the solvent mixtures through membrane materials was calculated using the PV results as described in Kusumocahyo, S. P.; Sudoh, M, J Membr Sci 1999, 161, 77 and Binning, R. C.; Lee, R. J.; Jennings, J. F.; Martin, E. C. Ind Eng Chem 1961, 53, 45.

$$J_i = P_i[p_{i(feed)} - p_{i(permeate)}] = \frac{D_i}{h}[C_{i(feed)} - C_{i(permeate)}] \quad (5)$$

The $D_i$ is assumed to be constant across the effective membrane thickness, h; $C_{i(feed)}$ and $C_{i(permeate)}$ are respectively, composition of the liquids present in the feed and in the permeate. The computed values of $D_i$ (where the subscript i stands for water or isopropanol) at 30° C. are presented in Table IV.

TABLE IV

Diffusion Coefficients of Water and Isopropanol Calculated from Eq. (5) at 30° C. for Different Membranes

| Mass % of Water in the Feed | $D_W \times 10^{10}$ (m²/s) eq. (5) | | | $D_{Iso-OH} \times 10^{10}$ (m²/s) eq. (5) | | |
|---|---|---|---|---|---|---|
| | NaAlg | NaAlg-1 | NaAlg-2 | NaAlg | NaAlg-1 | NaAlg-2 |
| 10 | 4.6 | — | — | 0.01 | — | — |
| 20 | 15.4 | 15.4 | 18.7 | 0.60 | 0.64 | 1.40 |
| 30 | 27.5 | 28.3 | 39.7 | 1.29 | 1.49 | 2.54 |
| 40 | 45.8 | 66.8 | 82.7 | 2.41 | 4.26 | 6.22 |
| 50 | 78.7 | 105 | 140 | 5.47 | 7.94 | 1.22 |
| 60 | 120 | 160 | 211 | 9.03 | 11.1 | 2.34 |
| 70 | — | 355 | — | 28.0 | 18.7 | — |
| 80 | 480 | — | — | — | — | — |

As expected, diffusion coefficients of water increase considerably with increasing amount of water in the feed mixture suggesting that the membranes are water-selective. Such an increase in the amount of water is dramatic at higher compositions of water in the feed mixture. The increase in $D_i$ values with increasing amount of water in the feed mixture is attributed to the creation of extra free volume of the membrane matrix. Similarly, diffusion coefficients of isopropanol, even though they are quite smaller in magnitude than those observed for water, show a slight increase with an increasing amount of water in the feed mixture, except in the case of the NaAlg-2 membrane.

As regards the nature of the membranes, diffusion values show a systematic trend i.e., with increasing mass % of water in the feed mixture, the $D_i$ values also increase systematically from NaAlg to NaAlg-2. In case of isopropanol, diffusion coefficients increase from neat NaAlg to NaAlg-1, and to a lesser extent from NaAlg-1 to NaAlg-2 membranes.

Example 8

Effect of Temperature

Temperature dependence of pervaporation flux and diffusivity results for the feed mixture containing 20 mass % of water presented in Table V were used to estimate the activation parameters in the Arrhenius equation:

$$J_P = J_{P0} \exp(-E_P/RT) \quad (6)$$

Here, $E_P$ is activation energy for permeation, $L_{P0}$ is permeation rate constant, R is gas constant and T is temperature in Kelvin. If activation energy is positive, then permeation flux increases with increasing temperature, which is generally observed in PV experiments. (See Burshe, M. C.; Netke, S. A.; Sawant, S. B.; Joshi, J. B.; Pangarkar, V. G. Sep Sci Technol 1997, 32, 1335; and Nam, S. Y.; Lee, Y. M. J Membr Sci 1999, 157, 63.)

TABLE V

Pervaporation Flux and Separation Selectivity at Different Temperature for 20 Mass % of Water in the Feed Mixture for Different Membranes

| Temp. (° C.) | $J_p \times 10^2$ (kg/m²h) eq. (3) | | | $\alpha_{sep}$, eq. (4) | | |
|---|---|---|---|---|---|---|
| | NaAlg | NaAlg-1 | NaAlg-2 | NaAlg | NaAlg-1 | NaAlg-2 |
| 30 | 13.8 | 15.1 | 17.2 | 96.0 | 96.0 | 53.1 |
| 40 | 19.1 | 18.1 | 19.7 | 68.7 | 60.0 | 43.1 |
| 50 | 25.9 | 20.5 | 21.9 | 55.3 | 53.1 | 30.8 |

The driving force for mass transport, which represents the concentration gradient resulting from the difference in partial vapor pressure of permeants between the feed and the permeate, increases with increasing temperature. As the feed temperature increases, the vapor pressure in the feed compartment also increases, but the vapor pressure at the permeate side is not affected resulting in increase of driving force at higher temperatures. The apparent activation energy data for permeation, $E_p$ calculated from the slopes of the straight lines of the Arrhenius plots using the least squares method are presented in Table VI. The $E_p$ values vary according to the sequence: NaAlg>NaAlg-1>NaAlg-2.

TABLE VI

Permeation and Diffusion Activation Energies, Heat of Sorption of Water and Energy Difference Values of the Membranes

| Parameters | NaAlg | NaAlg-1 | NaAlg-2 |
|---|---|---|---|
| $E_P$ (kJ/mol) eq. (6) | 5.60 | 1.59 | .84 |
| $E_D$ (kJ/mol) eq. (7) | 7.07 | 4.05 | 2.38 |
| $\Delta H_S$ (kJ/mol) | 1.49 | 2.47 | 2.54 |
| $E_{ISO-OH} - E_W$ (kJ/mol) | 6.63 | 4.24 | 2.16 |

Similarly, results of mass transport due to activated diffusion are described by the equation:

$$D_i = D_{io} \exp(-E_D/RT) \quad (7)$$

Here, $E_D$ is energy of activation for diffusion and i represents water or isopropanol. Arrhenius plots are linear in the temperature interval studied. Heat of sorption values have been calculated as: $\Delta H_S$ ($\cong E_P - E_D$). These results are included in Table V. The $\Delta H_S$ values are negative in all the cases suggesting an endothermic process for sorption. The $E_p$ values of the membranes show the sequence: NaAlg>NaAlg-1>NaAlg-2.

The temperature dependency of $\alpha_{sep}$ was investigated using the relationship described in Ping, Z. H.; Nguyen, Q. T.; Clement, R.; Neel, J. J Membr Sci 1990, 48, 297, which is as follows:

$$Y_w = \frac{1}{1 + \left(\frac{J_{Iso-OH}}{J_W}\right) \exp\left(\frac{-(E_{Iso-OH} + E_W)}{RT}\right)} \quad (8)$$

where $Y_w$ is water composition in the permeate, $J_w$ and $J_{Iso-OH}$ are permeation fluxes; $E_W$ and $E_{Iso-OH}$ are Arrhenius activation energies for water and isopropanol, respectively at the average energy level. A positive value of $[E_{Iso-OH} - E_W]$ indicates that $\alpha_{sep}$ decreases with increasing temperature, while negative value indicates that $\alpha_{sep}$ increases with an increase in temperature. For all the membranes, the difference ($E_{Iso-OH}-E_W$) is positive (see Table V) further supporting that $\alpha_{sep}$ decreases with increasing temperature.

Example 9

Synthesis of Glutaraldehyde Crosslinked Membranes

The following membranes were used in Examples 10–13. The medium viscosity grade sodium alginate (viscosity of 230 mPa·s for 5% solution) was a reagent grade chemical in the present example. High viscosity grade sodium alginate (viscosity of 170 mPa·s for 1% solution), low viscosity grade sodium alginate (with a viscosity of 138 mPa·s for 5% solution, all viscosities measured at the shear rate of 69.8 l/s, using the Brookfield Rheometer, Model DV-III at 30° C.), PVA acetic acid, methanol, glutaraldehyde (25% in water) and PEG (200) were all of AR grade samples. Double distilled water was used throughout this example.

To fabricate a pure sodium alginate membrane, 5 g of polymer was dissolved in 100 mL of distilled water. The solution was filtered through a cotton plug, cast on a glass plate and evaporated to dryness in a dust free atmosphere at room temperature. The membrane formed was peeled off from the glass plate and crosslinked by immersion in an acidic solution of methanol:water (75:25 by volume) and also containing 1 vol % of glutaraldehyde. After immersion for 12 h the membrane was dried again at room temperature. The membranes of the present example prepared with low, medium and high viscosity grade SA polymers are designated, respectively as SA-LV, SA-MV and SA-HV. Such membranes were prepared as above by solution casting method. Due to high water uptake capacity, the high viscosity grade SA polymer required more of water to solubilize and also it was difficult to remove the undissolved particles by filtration. In addition, it flows out of the casting glass plate posing further difficulty in controlling membrane thickness. Due to differences in solution viscosity and increased water retaining capacity, the drying rate of the membranes with low and medium viscosity was much less when compared to the membranes prepared from high viscosity polymer.

Based on membrane performance, SA-LV sample was selected for further modification. Different variations of this membrane were prepared by adding 10 mass % of PEG and varying amounts of PVA from 5 to 20 mass %. During formation a previously prepared PVA and PEG solution was added to the SA solution and stirred for 2 h at room temperature. The membranes thus prepared are designated as SA-1, SA-2 and SA-3, and respectively contained 5, 10 and 20 mass % of PVA. The membranes were crosslinked with glutaraldehyde in an acidic solution of water:ethanol in the volume ratio of 75:25. Ethanol, being a nonsolvent, helped to prevent the initial dissolution of the membrane and water present in the solution resulted in membrane swelling, thus facilitating an easy penetration of glutaraldehyde into the membrane matrix. The membranes were stored at room temperature in a desiccator before they were used in PV experiments.

The cross-linking reaction took place between —OH group of sodium alginate and —CHO group of glutaraldehyde with the formation of ether linkage by eliminating water, which is commonly observed in case of cellulose-based hydrophilic polymers. It has been well documented in the literature that SA membranes are rigid and have a broad free volume distribution, so that polymer chains relax to achieve a narrow free volume distribution, thus altering the PV performance of the membrane. Hence, to avoid these problems and to increase membrane flexibility as well as membrane performance, PEG and PVA were added. Addition of 10 mass % PEG was used in all membranes to produce a more flexible membrane. Other low mass % PEG amounts may be used to obtain a desired balance between flexibility and selectivity and flux.

In the same manner, PVA was added to increase the permeation flux. Although only 5, 10 and 20 mass % PVA was added to the membranes of the present example, it will be understood that other low mass % PVA amounts may be used to obtain a desired flux in a given membrane. Specifically, any mass % between 5 and 20 should be acceptable.

Example 10

Equilibrium Sorption and Sorption Selectivity ($\alpha_{sorp}$)

Equilibrium sorption was studied in the same way as explained in Example 5. These data are presented in Table VII.

TABLE VII

Equilibrium Mass % Uptake (S) of the Membranes at 30° C.

| Mass % of Water in the Feed | S (kg/kg) %, | | | | | |
|---|---|---|---|---|---|---|
| | SA-LV | SA-MV | SA-HV | SA-1 | SA-2 | SA-3 |
| 10 | 19.90 | 28.06 | 25.47 | 31.10 | 41.21 | 55.37 |
| 20 | 27.72 | 31.18 | 32.51 | 40.33 | 52.01 | 63.64 |
| 30 | 38.84 | 41.45 | 44.25 | 49.94 | 61.47 | 72.99 |
| 40 | 48.41 | 48.09 | 58.20 | 63.51 | 67.34 | 76.29 |
| 50 | 56.38 | 59.83 | 91.23 | 68.78 | 78.51 | 82.41 |
| 60 | 61.17 | 67.33 | 124.32 | 77.20 | 85.20 | 82.78 |
| 70 | 63.41 | 70.99 | 152.63 | 80.24 | 84.32 | 86.40 |

Sorption selectivity was calculated in the same manner as was done in Example 5. The cold trap surrounded by liquid nitrogen was heated to 120° C. (close to the boiling temperature of HAc, 117.5° C.). The vapor was condensed in a cold trap surrounded by a liquid nitrogen jar. Composition of the condensed liquid mixture was then calculated by measuring the refractive index (accurate up to ±0.0002 units). Sorption selectivity was calculated as before using Eq. 2.

PV tests were performed in the same manner as explained in Example 6. The mass % water in acetic acid mixture was varied from 10 to 50. After taking 150 mL of the mixture in the feed compartment, the test membrane was allowed to equilibrate for 2 h. The downstream vacuum pressure was 0 torr.

The results of % equilibrium mass uptake (S) of the neat sodium alginate membranes (SA-LV, SA-MV and SA-HV) as well as the modified sodium alginate membranes (SA-1, SA-2 and SA-3) from low viscosity grade sample at 30° C. are presented in Table VII. In case of membranes prepared from low viscosity and medium viscosity grade sodium alginate samples, mass % equilibrium values increase systematically with increasing amount of water in the feed mixture.

In case of membranes prepared from high viscosity grade sodium alginate samples, the % equilibrium mass uptake values increase steadily up to 40 mass % of water in the feed mixture and later it increases considerably resulting in equilibrium swelling up to 150 mass %. The % equilibrium sorption results of the modified membranes (SA-1, SA-2 and SA-3) prepared from low viscosity SA grade polymer, PEG and PVA are higher than those of the neat sodium alginate membranes.

The % composition of water in each membrane was calculated as a function of mass % of water in the feed mixture and these data are presented at 30° C. in Table VIII for neat as well as modified sodium alginate membranes. It was observed that there is not much variation in % composition of water for SA-LV, SA-MV and SA-HV membranes, but generally an increase in % composition of water in the membrane was observed with the increasing amount of water in the feed mixture. The same trend is also observed with the modified membranes, SA-1, SA-2 and SA-3.

The results of sorption selectivity of the membranes at 30° C. for the neat sodium alginate and the modified SA-LV membranes are also presented in Table VIII. In both cases, sorption selectivity decreases considerably with increasing amount of water (say up to about 50 mass %) in the feed mixture and then levels off. Sorption selectivity varies only slightly with the type of sodium alginate in the membrane. Sorption selectivity generally decreases with increasing viscosity of the sodium alginate samples. Similarly, with increasing amount of PVA in the modified membranes, sorption selectivity decreases systematically over the entire composition range of the feed mixture.

TABLE VIII

% Composition of Water Sorbed in the Membranes and Sorption Selectivity ($\alpha_{sorp}$) at 30° C.

| Mass % of Water in the Feed | SA-LV | SA-MV | SA-HV | SA-1 | SA-2 | SA-3 |
|---|---|---|---|---|---|---|
| % Composition of Water in the Membrane | | | | | | |
| 10 | 61.50 | 61.00 | 61.00 | 57.00 | 52.50 | 47.00 |
| 20 | 70.00 | 72.50 | 68.00 | 63.00 | 57.00 | 51.25 |
| 30 | 71.00 | 69.75 | 60.00 | 65.25 | 61.50 | 60.50 |
| 40 | 71.75 | 69.50 | 69.25 | 68.00 | 66.00 | 65.50 |
| 50 | 74.00 | 72.00 | 71.50 | 72.50 | 70.00 | 72.50 |
| 60 | 76.00 | 77.00 | 73.50 | 76.50 | 75.50 | 74.00 |
| 70 | 82.50 | 76.00 | 79.50 | 82.25 | 82.00 | 79.00 |
| Sorption Selectivity, $\alpha_{sorp}$ | | | | | | |
| 10 | 14.2 | 14.1 | 13.5 | 10.92 | 9.80 | 7.85 |
| 20 | 9.24 | 10.4 | 8.47 | 6.78 | 5.28 | 4.20 |
| 30 | 5.71 | 5.36 | 3.48 | 4.41 | 3.62 | 3.52 |
| 40 | 3.79 | 3.39 | 3.74 | 3.15 | 2.90 | 2.84 |
| 50 | 2.85 | 2.55 | 2.51 | 2.72 | 2.33 | 2.64 |
| 60 | 2.11 | 2.20 | 1.86 | 2.18 | 2.06 | 1.92 |
| 70 | 2.03 | 1.35 | 1.68 | 2.00 | 1.97 | 1.62 |

Example 11

Membrane Performance

Membranes performance was studied by calculating total permeation flux, $J_p$ and separation selectivity, $\alpha_{sep}$ as in the previous examples. The results of pervaporation flux and separation selectivity are presented in Table IX for the neat sodium alginate as well as the modified SA-LV membranes. For all the membranes, the pervaporation flux increases considerably with an increase in mass % of water in the feed mixture up to 40 mass % of water and then levels off. This may be the result of the interaction between water and sodium alginate resulting in an increased swelling of the membrane due to facilitated diffusion of the permeant molecules.

The increase in flux remains constant beyond 40 mass % of water in the feed mixture for all the membranes. Even though the difference in flux of the membranes is negligible at higher water content of the feed mixture, but they vary slightly at lower water content signifying the effect of polymer viscosity at lower water content of the feed mixture.

Chiang and Hu[26] observed similar effects in their study on PV separation of water-ethanol mixtures using the blend membranes of PVA-g-MMA/MA. The flux of modified SA-LV membranes increases with an increasing amount of water in the feed mixtures. The modified membrane (SA-3) with higher amount of PVA showed higher flux than all the other membranes.

The results of % composition of water in the permeate mixture at 30° C. are included in Table IX. Generally, for the neat sodium alginate membranes, the amount of water in the permeate mixture decreases slightly with increasing viscosity of the SA polymer used. On the contrary, a considerable decrease in mass % composition of water is observed in permeate mixture with increasing amount of PVA in the modified membranes. This increase in water content of the neat sodium alginate membranes may be due to the increased selective interaction of the permeate water molecules with COOH and —OH groups of sodium alginate while the decrease in water content in low viscosity grade modified membranes may be due to higher plasticization effect of water resulting in an increased chain mobility and increased free volume of the polymer, thereby accommodating more of acetic acid molecules in the membrane matrix.

The results of separation selectivity presented in Table IX show the least effect with polymer viscosity, but the values of $\alpha_{sep}$ decrease with increasing amount of water in the feed mixture. On the other hand, $\alpha_{sep}$ vary drastically with the polymer modifications i.e., these values decrease considerably with an increasing amount of PVA in the membrane. In case of neat SA membranes (SA-LV, SA-MV and SA-HV) separation selectivity increases considerably at 20 mass % of water and thereafter decreases rapidly up to 30 mass % of water and then remains constant beyond 40 mass % of water in the feed mixture. With the modified membranes, separation selectivity follows a systematic decreasing trend up to 20 mass %, beyond which it remains constant.

TABLE IX

Pervaporation Flux, % Composition of Water in Permeate and Separation Selectivity at Different Mass % of Water in the Feed Mixture at 30° C. for Different Membranes

| Mass % Water in Feed | SA-LV | SA-MV | SA-HV | SA-1 | SA-2 | SA-3 |
|---|---|---|---|---|---|---|
| $J_p \times 10^2$ (kg/m².h), | | | | | | |
| 10 | 2.20 | 3.69 | 3.72 | 2.39 | 4.25 | 7.39 |
| 20 | 6.90 | 14.5 | 14.5 | 16.3 | 24.8 | 25.6 |
| 30 | 25.8 | 30.2 | 27.4 | 29.1 | 32.7 | 40.8 |
| 40 | 48.5 | 47.3 | 48.5 | 47.1 | 49.9 | 53.3 |
| 50 | 47.7 | 47.7 | 47.7 | 52.3 | 58.1 | 76.0 |
| % Composition of Water in the Permeate | | | | | | |
| 10 | 63.5 | 62.0 | 61.5 | 81.8 | 70.0 | 54.0 |
| 20 | 84.5 | 81.5 | 79.5 | 72.0 | 72.0 | 67.0 |
| 30 | 73.0 | 73.0 | 72.3 | 69.5 | 67.0 | 61.5 |
| 40 | 72.5 | 72.5 | 78.8 | 74.5 | 72.3 | 70.0 |
| 50 | 73.0 | 78.0 | 80.0 | 79.5 | 77.8 | 80.0 |
| Separation Selectivity, $\alpha_{sep}$ | | | | | | |
| 10 | 15.7 | 14.7 | 14.4 | 40.3 | 21.0 | 10.6 |
| 20 | 21.8 | 17.6 | 15.5 | 10.3 | 10.3 | 8.12 |
| 30 | 6.31 | 6.31 | 6.08 | 5.32 | 4.74 | 3.73 |
| 40 | 3.96 | 3.96 | 5.56 | 4.38 | 3.91 | 3.50 |
| 50 | 2.70 | 3.55 | 4.00 | 3.88 | 3.50 | 4.00 |

Example 12

Diffusive Transport

The computed values of water ($D_w$) and acetic acid ($D_{HAc}$) at 30° C. are presented in Table X. Diffusion of water is higher than HAc in all the membranes studied. The diffusion coefficients increase considerably with increasing amount of water in the feed mixture suggesting water selectivity of the membranes. Such as increase in $D_w$ with increasing amounts of water in the feed mixture is attributed to the creation of extra free volume in the membrane matrix thus facilitating the water transport through the pore volume. In addition, $D_i$ increased systematically with an increase in the amount of PVA in the modified membranes. However, diffusion trends of both water and acetic acid for the neat SA as well as the modified SA membranes are not very dependent upon the viscosity or even the modifications of the polymers.

TABLE X

Diffusion Coefficients of Water and Acetic Acid
Calculated from eq. (5) at 30° C. for Different Membranes

| Mass % of Water in the Feed | SA-LV | SA-MV | SA-HV | SA-1 | SA-2 | SA-3 |
|---|---|---|---|---|---|---|
| $D_W \times 10^{10}$ (m²/s), | | | | | | |
| 10 | 2.17 | 3.66 | 3.70 | 2.27 | 4.13 | 7.56 |
| 20 | 7.55 | 16.0 | 16.2 | 28.6 | 18.8 | 30.4 |
| 30 | 36.4 | 42.7 | 39.1 | 42.7 | 49.3 | 66.3 |
| 40 | 90.2 | 87.9 | 82.1 | 84.8 | 93.1 | 104 |
| 50 | 126 | 111 | 106 | 118 | 136 | 169 |
| $D_{HAc} \times 10^{10}$ (m²/s), eq. (5) | | | | | | |
| 10 | 1.24 | 2.24 | 2.32 | 0.51 | 1.77 | 6.44 |
| 20 | 1.38 | 36.2 | 4.16 | 11.1 | 7.31 | 15.0 |
| 30 | 13.5 | 15.8 | 15.0 | 18.7 | 24.3 | 41.5 |
| 40 | 34.2 | 33.3 | 22.1 | 29.0 | 35.7 | 44.4 |
| 50 | 46.7 | 31.2 | 26.5 | 30.3 | 38.7 | 42.2 |

Example 13

Effect of Temperature

For temperature variation studies, only 20 mass % water containing mixture was employed during membrane formation and the pervaporation flux and separation selectivity of these membranes were studied at 30, 40 and 50° C. These data for all the membranes are summarized in Table XI. In all cases, pervaporation flux increased with increasing temperature, but a reverse trend is observed for separation selectivity. The results of permeation flux have been derived by the Arrhenius equation. If $E_P$ is positive, then permeation flux increases with increasing temperature as observed in the prior art. Driving force for mass transport also increases with increasing temperature. The values of $E_P$ calculated from the slopes of the straight lines of the Arrhenius plots by the least squares method are presented in Table XII. The $E_P$ values do not show any systematic trend with the type of SA or modified SA used.

The temperature dependent mass transport due to activated diffusion was also derived by the Arrhenius equation. The Arrhenius plots of log $D_i$ vs 1000/T for water diffusion are also linear in the temperature interval studied and the $E_D$ values are positive in all the cases; these do not show any systematic variation with the nature of the membrane. The heat of sorption values $\Delta H_S$ calculated from the difference: ($\cong E_P - E_D$) included in Table VII are negative in all cases suggesting an endothermic sorption process.

The temperature dependency of $\alpha_{sep}$ was also estimated as described above. A positive value of $[E_{HAc} - E_W]$ indicates that $\alpha_{sep}$ decreases with increasing temperature, but a negative value indicates that $\alpha_{sep}$ increases with an increase in temperature. For all the membranes, the difference is positive (see Table XII) further supporting the observation of decreases in $\alpha_{sep}$ with increasing temperature.

TABLE XI

Pervaporation Flux, Separation Selectivity and
Diffusion Coefficients of Water and Acetic Acid at
Different Temperatures for 20 Mass % of Water in the Feed Mixture

| Temp. ° C. | SA-LV | SA-MV | SA-HV | SA-1 | SA-2 | SA-3 |
|---|---|---|---|---|---|---|
| $J_P \times 10^2$ (kg/m²h), | | | | | | |
| 30 | 6.91 | 14.5 | 14.5 | 11.2 | 13.3 | 22.7 |
| 40 | 14.2 | 19.7 | 17.7 | 18.2 | 21.7 | 26.0 |
| 50 | 15.8 | 26.3 | 24.2 | 26.2 | 31.2 | 33.5 |
| Separation Selectivity, $\alpha_{sep}$, eq. (4) | | | | | | |
| 30 | 21.8 | 17.6 | 15.5 | 11.2 | 10.3 | 5.88 |
| 40 | 16.0 | 14.6 | 10.6 | 8.90 | 9.22 | 5.09 |
| 50 | 12.0 | 11.7 | 9.33 | 7.27 | 8.12 | 4.33 |
| $D_W \times 10^{10}$ (m²/s), eq. (5) | | | | | | |
| 30 | 7.54 | 16.0 | 16.2 | 12.8 | 15.3 | 28.5 |
| 40 | 15.7 | 22.1 | 20.4 | 21.3 | 25.3 | 33.7 |
| 50 | 18.0 | 29.9 | 28.3 | 31.7 | 37.1 | 45.3 |
| $D_{HAc} \times 10^{10}$ (m²/s), eq. (5) | | | | | | |
| 30 | 1.4 | 3.6 | 4.16 | 4.6 | 5.96 | 19.4 |
| 40 | 3.9 | 6.0 | 7.72 | 9.6 | 11.0 | 26.5 |
| 50 | 6.0 | 10.3 | 12.1 | 17.4 | 18.3 | 41.8 |

TABLE XII

Permeation and Diffusion Activation Energies,
Heat of Sorption of Water and Energy Difference Values of the Membranes

| Activation Parameters | SA-LV | SA-MV | SA-HV | SA-1 | SA-2 | SA-3 |
|---|---|---|---|---|---|---|
| $E_P$ (kJ/mol) eq. (6) | 29.19 | 47.20 | 18.49 | 29.31 | 31.89 | 10.31 |
| $E_D$ (kJ/mol) eq. (7) | 35.60 | 52.30 | 25.63 | 37.00 | 35.85 | 18.88 |
| $\Delta H_S$ (kJ/mol) | −6.41 | −5.10 | −7.14 | −7.69 | −3.96 | −8.57 |
| $E_{HAc} - E_W$ (kJ/mol) | 24.40 | 92.43 | 17.88 | 17.74 | 9.50 | 12.38 |

Example 14

Synthesis of Polyacrylenitrile-g-Polyvinyl Alcohol Membranes

The following membranes were used in Examples 15–18. PVA (mol. wt. 1,25,000), analytical grade acrylonitrile (AN), laboratory reagent grade glutaraldehyde (25% content in water), analytical reagent grade samples of dimethyl formamide (DMF), and reagent grade ceric ammonium nitrate (CAN), dimethyl sulfoxide (DMSO), hydrochloric acid and acetone were used in the following examples. All the chemicals were used without further purification. Double distilled deionized water was used throughout the examples.

In a three-necked round bottom flask fitted with a condenser, gas inlet and a thermometer, about 10 g of PVA was dissolved in 100 mL of DMSO at 60° C. under constant stirring in a nitrogen atmosphere. After cooling the solution, AN was added by stirring. To this, 5 mL of 0.1M of cerric ammonium nitrate (CAN) was added and the reaction mixture was maintained between 50 and 60° C. for 4 h. The polymer was precipitated by adding excess acetone, filtered through a suction pump and dried in a vacuum oven at 60° C. Two copolymers with % grafting of 46 and 93 (designated, respectively as PVA-1 and PVA-2) were prepared by using 5 and 10 g of AN, respectively. In both membranes a 100% grafting efficiency was achieved with 92% conversion of AN.

Saturated amounts of neat PVA, and PVA-1 and PVA-2 polymers were dissolved separately in 100 mL of DMSO at 50° C. with constant stirring under a slow stream of nitrogen gas and the solution was cooled to room temperature. To these polymer solutions, 0.0035 mol of glutaraldehyde and 0.5 mL of 1N HCl were added and stirred for 30 min to achieve an effective cross-linking of the copolymer. Films were cast on clean glass plates by pouring uniformly the polymer solutions under controlled humidity conditions. Membranes were dried at room temperature in a dust free atmosphere and cured at 60° C. in an oven. The dried membranes were peeled off from the glass plates and washed with water repeatedly to remove the excess glutaraldehyde and HCl, and then allowed to dry at room temperature for 24 h.

Example 15

Polymer Characterization

Prior to membrane formation, the copolymers were characterized by FTIR spectra scanned in the range 4000–400 cm$^{-1}$ using KBr pellets on a Nicolet spectrometer (Model, Impact 410, USA). A broad band appearing at ~3382 cm$^{-1}$ corresponds to —OH stretching vibrations of the hydroxyl groups of PVA; the peak at 2938 cm$^{-1}$ is assigned to aliphatic —C—H stretching vibration; the peak at 1647 cm$^{-1}$ corresponds to carbonyl group. A strong band appearing at ~2246 cm$^{-1}$ corresponds to —CN stretching vibrations of acrylonitrile thus confirming grafting reaction between PAN and PVA.

Example 16

Swelling Experiments

Swelling experiments were performed in water and DMF mixtures of different compositions at 25±0.5° C. in an electronically controlled oven (WTB Binder, Model, BD-53, Germany) as per the procedures known in the art. Polymer samples were placed inside the air-tight test bottles containing different amounts of water and DMF. Test bottles were placed in the oven maintained at 25° C. After 24 h (i.e., after complete attainment of equilibrium), membranes were removed and the surface-adhered solvent drops were removed using soft filter papers and weighed immediately. The degree swelling (DS) was calculated by taking the ratio of equilibrium mass, W∞ to that of dry mass $W_o$ of the membrane by using, $$DS = \frac{W_\infty}{W_o}. \qquad (9)$$

Example 17

Pervaporation Tests

Pervaporation experiments were carried out for water-DMF mixtures using the apparatus described above for sodium alginate membranes. The composition of DMF was varied from 10 to 90 mass % at 25° C. From the PV data, separation selectivity, $\alpha_{sep}$ and permeation flux were calculated similarly as described for the sodium alginate membranes above. The results of pervaporation flux and separation selectivity for different mass % of water in the feed mixture at 25° C. are presented in Table XIII.

TABLE XIII

Total Pervaporation Flux and Separation Selectivity Data for Different Mass % of Water in the Feed Mixture at 25° C.

| Mass % water | Jp 10$^2$ (kg/m$^2$h) | | | $\alpha_{sep}$ | | |
|---|---|---|---|---|---|---|
| | PVA | PVA-1 | PVA-2 | PVA | PVA-1 | PVA-2 |
| 10 | 1.6 | 0.9 | 0.18 | 17.1 | 18.1 | 21.2 |
| 20 | 5.0 | 4.2 | 1.0 | 22.7 | 20.3 | 24.0 |
| 30 | 6.5 | 3.3 | 2.2 | 26.8 | 27.1 | 29.4 |
| 40 | 7.4 | 5.5 | 1.8 | 28.5 | 30.0 | 31.1 |
| 50 | 9.2 | 9.7 | 5.3 | 24.0 | 28.8 | 34.1 |
| 60 | 11.1 | 9.1 | 7.5 | 26.0 | 32.1 | 33.4 |
| 70 | 14.0 | 12.3 | 7.3 | 18.2 | 30.1 | 36.7 |
| 80 | 15.5 | 12.3 | 10.8 | 16.4 | 24.5 | 31.2 |
| 90 | 20.0 | 16.4 | 9.3 | 11.0 | 15.0 | 23.9 |

Example 18

Membrane Performance

Degree of swelling increases with an increase in mass % of water in the feed for all the membranes. Degree of swelling is higher for neat PVA when compared to PVA-1 and PVA-2 membranes, the lowest value is observed for PVA-2. Thus, degree of swelling decreases with an increase in % grafting of the copolymer.

The total permeation flux for PVA is higher than those of the grafted membranes (PVA-1 and PVA-2). Decreasing trend in the $J_p$ values with increasing grafting of the copolymer membranes may be the result of increased hydrophobicity of the copolymer resulting in lower water flux. As the mass % of water in the feed mixture increases, hydrophilic interactions also increase and hence, the total flux values increase systematically with increasing water content in the feed mixture (see Table XIII).

The results of $\alpha_{sep}$ also included in Table XIII show a steady increase from PVA to PVA-2 membrane i.e., with increasing grafting of the membranes. The $\alpha_{sep}$ values of all the membranes are maximum between 40 and 70 mass % of water in the feed mixture and beyond this mass % water they show a decreasing trend. It is observed that $\alpha_{sep}$ is optimum at 40 mass % of water for PVA, while for PVA-1, the optimum value of $\alpha_{sep}$ is observed at 60 mass % of water in the feed. However, PVA-2 membrane exhibits the maximum $\alpha_{sep}$ of 36.7 at 70 mass % of water in the feed mixture. Thus, separation selectivity of the membranes depends on polymer morphology.

Pervaporation flux of water and DMF as a function of mass % of water in the feed are presented at 25° C., in Table XIV. For PVA membrane, the water flux ($J_w$) increases systematically with increasing amount of water in the feed mixture, but for PVA-1 and PVA-2 membranes, the flux does not vary systematically with the amount of water present in the feed mixture. In general, there is an increase of water flux with increasing amount of water in the feed mixture. Similarly, the flux data of DMF for PVA, PVA-1 and PVA-2 membranes, even though decrease generally with increasing amount of water in the feed mixture, but the effect is not very systematic. A comparison of flux data of water and DMF in Table XIV indicate that water has higher flux than DMF; particularly more so at higher amounts of water in the feed mixture.

TABLE XIV

Pervaporation Flux Data of Water and DMF at Different Mass % of Water in the Feed Mixture at 25° C. for Different Membranes

| Mass % | $J_W \cdot 10^2$ (kg/m²h) | | | $J_{DMF} \cdot 10^2$ (kg/m²h) | | |
|---|---|---|---|---|---|---|
| water | PVA | PVA-1 | PVA-2 | PVA | PVA-1 | PVA-2 |
| 10 | 1.1 | 0.6 | 0.13 | 0.55 | 0.30 | 0.05 |
| 20 | 4.3 | 3.5 | 0.86 | 0.75 | 0.69 | 0.14 |
| 30 | 6.0 | 3.1 | 2.0 | 0.52 | 0.26 | 0.16 |
| 40 | 7.0 | 5.2 | 1.7 | 0.37 | 0.26 | 0.08 |
| 50 | 8.8 | 9.4 | 5.2 | 0.37 | 0.33 | 0.15 |
| 60 | 10.8 | 8.9 | 7.4 | 0.28 | 0.19 | 0.15 |
| 70 | 13.7 | 12.1 | 7.2 | 0.32 | 0.17 | 0.08 |
| 80 | 15.3 | 12.2 | 10.7 | 0.23 | 0.12 | 0.09 |
| 90 | 19.8 | 16.3 | 9.3 | 0.20 | 0.12 | 0.04 |

The effect of temperature on pervaporation flux and selectivity was investigated for the feed mixture containing 10 mass % of water. These data at 25, 35 and 45° C. are presented in Table XV. With increasing temperature, flux also increases while selectivity decreases. Flux decreases from neat PVA to PVA-1 and PVA-2 at all the temperatures, thus showing the effect of extent of polymer grafting. On the other hand, $\alpha_{sep}$ values increase from neat PVA to PVA-1 and PVA-2 membranes at all the temperatures. These results are in conformity with the findings of Neel et al., who considered that selective diffusion in the dry region of the membrane at the downstream side is important to determine the overall membrane selectivity. Similarly, Mulder et al. interpreted the selectivity data as due to the preferential sorption of one of the components of the binary mixture with the swollen polymeric membrane at the upstream side. The present membranes are preferentially more selective to water than DMF.

TABLE XV

Pervaporation Flux and Separation Selectivity at Different Temperatures for 10 Mass % of Water in the Feed Mixture

| Temp | $J_p \cdot 10^2$ (kg/m²h) | | | $\alpha_{sep}$ | | |
|---|---|---|---|---|---|---|
| (° C.) | PVA | PVA-1 | PVA-2 | PVA | PVA-1 | PVA-2 |
| 25 | 1.6 | 0.9 | 0.18 | 17.1 | 18.12 | 21.2 |
| 35 | 3.6 | 1.5 | 1.2 | 13.2 | 15.41 | 19.13 |
| 45 | 12.6 | 5.3 | 4.01 | 6.5 | 13.52 | 16.41 |

The diffusion coefficients, $D_i$ of the permeants were calculated as before. Computed values of $D_i$ (where the subscript i stands for water or DMF) at 25° C. are presented in Table XVI. Values of $D_w$ for water are much higher than those observed for DMF in all the membranes at all the feed compositions of water, further suggesting that membranes of this study are more water selective than DMF. This is further supported by the fact that with an increasing amount of water in the feed mixture, the $D_w$ values also increase considerably, but not so much for DMF. Since PVA is a more hydrophilic polymer than the grafted copolymer membranes (PVA-1 and PVA-2), diffusion coefficients of water and DMF are higher for PVA than those observed for the grafted copolymer membranes (PVA-1 and PVA-2). Among the grafted copolymer membranes, PVA-1 with a lower grafting ratio has higher diffusivity than PVA-2 membrane. Diffusion coefficients for 10 mass % of water in the feed mixture at different temperatures are presented in Table XVII. Values of $D_i$ for both water and DMF increase with an increase in temperature. Also, diffusion of water is always higher than that of DMF for all the membranes and at all the temperatures.

TABLE XVI

Diffusion Coefficients of Water and DMF Calculated from Eq. 5 at 25° C.

| Mass % | $D_W \times 10^9$ (m²/s) | | | $D_{DMF} \times 10^9$ (m²/s) | | |
|---|---|---|---|---|---|---|
| water | PVA | PVA-1 | PVA-2 | PVA | PVA-1 | PVA-2 |
| 10 | 2.64 | 1.48 | 0.29 | 1.39 | 0.74 | 0.12 |
| 20 | 9.15 | 7.73 | 1.83 | 1.61 | 1.52 | 0.30 |
| 30 | 13.50 | 6.93 | 4.56 | 1.18 | 0.60 | 0.36 |
| 40 | 17.90 | 13.23 | 4.34 | 0.94 | 0.66 | 0.21 |
| 50 | 26.88 | 28.22 | 15.29 | 1.12 | 0.68 | 0.45 |
| 60 | 40.40 | 32.93 | 27.06 | 1.04 | 0.68 | 0.54 |
| 70 | 69.13 | 59.37 | 34.88 | 1.63 | 0.85 | 0.41 |
| 80 | 115.6 | 89.76 | 78.10 | 1.76 | 0.92 | 0.63 |
| 90 | 308.0 | 246.0 | 135.9 | 3.11 | 1.82 | 0.63 |

TABLE XVII

Diffusion Coefficients of Water and DMF Calculated from Eq. 4 at Different Temperatures for 10 Mass % of Water in the Feed Mixture

| Temp | $D_W \times 10^9$ (m²/s) | | | $D_{DMF} \times 10^9$ (m²/s) | | |
|---|---|---|---|---|---|---|
| (° C.) | PVA | PVA-1 | PVA-2 | PVA | PVA-1 | PVA-2 |
| 25 | 2.64 | 1.48 | 0.29 | 1.39 | 0.74 | 0.12 |
| 35 | 6.06 | 2.50 | 1.97 | 4.12 | 1.46 | 9.27 |
| 45 | 23.15 | 8.90 | 6.64 | 3.20 | 5.93 | 3.64 |

Temperature-dependent results of permeation flux (Table XV) and diffusion (Table XVI) have been analyzed by the Arrhenius equations as explained before. The $E_P$ and $E_D$ values estimated by the method of least squares are given in Table XVIII. By using the $E_P$ and $E_D$ values for water, one may further compute the heat of sorption, $\Delta H_S$ for water permeation using the empirical relation: $\Delta H_S = E_P - E_D$ and these data are also included in Table XVIII. The $\Delta H_S$ values are negative in all the cases suggesting an endothermic sorption mode. The temperature dependence of separation selectivity (Table XV) was analyzed. A positive value of $(E_{DMF} - E_W)$ indicates that $\alpha_{sep}$ decreases with increasing temperature and negative values indicate that $\alpha_{sep}$ increases with an increase in temperature. In the present investigation, the values of $(E_{DMF} - E_W)$ are positive, indicating that $\alpha_{sep}$ decreases with increasing temperature as shown in Table XV.

TABLE XVIII

Permeation and Diffusion Activation Energies, Heat of Sorption for Water and Energy Difference Values for Different Membranes

| Parameter | PVA | PVA-1 | PVA-2 |
|---|---|---|---|
| $E_P$ (kJ/mol), Eq. (6) | 63.73 | 65.34 | 119.3 |

TABLE XVIII-continued

Permeation and Diffusion Activation Energies,
Heat of Sorption for Water and Energy Difference Values for
Different Membranes

| Parameter | PVA | PVA-1 | PVA-2 |
|---|---|---|---|
| $E_D$ (kJ/mol), Eq. (7) | 85.30 | 160.1 | 123.2 |
| $\Delta H_S$ (kJ/mol) | −21.57 | −94.78 | −3.48 |
| $E_{DMF} - E_W$ (kJ/mol) | 37.83 | 11.55 | 10.10 |

Example 18

Hybrid Purification System

A novel hybrid process may be used wherein one can combine with other purification or recovery steps a pervaporation process to remove the organics from water at the azeotropic concentration of water where the process is very economic compared to distillation or adsorption. Pervaporation may be combined with the electrodialysis process to remove the unwanted salts from the hard water.

What is claimed is:

1. A pervaporation membrane comprising:
   copolymeric PAN-grafted PVA having between approximately 46% to 93% PAN by mass of the PAN-grated PVA; and
   a cross-linking agent.

2. The membrane of claim 1 wherein the membrane is optimized for separation of DMF from water.

3. A method of separating DMF from water comprising the steps of:
   i) providing a pervaporation membrane formed from copolymeric PAN-grafted PVA and a cross-linking agent having between approximately 46% to 93% PAN by mass of the PAN-grated PVA;
   ii) placing the pervaporation membrane between two chambers in a pervaporation device with at least two chambers;
   iii) supplying water comprising DMF to one chamber;
   iv) decreasing the pressure in a second chamber on the other side of the pervaporation membrane.

4. A pervaporation device comprising:
   at least two chambers;
   a membrane affixed between the two chambers in manner to prevent fluid flow from one chamber to the other;
   wherein the membrane is formed from copolymeric PAN-grafted PVA and a cross-linking agent having between approximately 46% to 93% PAN by mass of the PAN-grated PVA.

5. The membrane of claim 1, wherein the cross-linking agent comprises glutaraldehyde.

6. The membrane of claim 1, wherein the membrane has a separation selectivity for water and an organic solute of at least 15%.

7. The membrane of claim 1, wherein the membrane has a separation selectivity for water and an organic solute of at least 30%.

8. The method of claim 3, wherein the cross-linking agent comprises glutaraldehyde.

9. The method of claim 3, wherein the membrane has a separation selectivity of at least 15%.

10. The method of claim 3, wherein the membrane has a separation selectivity of at least 30%.

11. The device of claim 4, wherein the cross-linking agent comprises glutaraldehyde.

12. The device of claim 4, wherein the membrane has a separation selectivity for water and an organic solute of at least 15%.

13. The device of claim 4, wherein the membrane has a separation selectivity for water and an organic solute of at least 30%.

* * * * *